(12) United States Patent
Wang et al.

(10) Patent No.: US 11,785,550 B2
(45) Date of Patent: Oct. 10, 2023

(54) METHOD FOR EFFICIENT REDISCOVERY AND MEDIUM ACCESS FOR WAKE-UP RADIOS

(71) Applicant: INTERDIGITAL PATENT HOLDINGS, INC., Wilmington, DE (US)

(72) Inventors: Xiaofei Wang, Cedar Grove, NJ (US); Hanging Lou, Syosset, NY (US); Joseph S. Levy, Merrick, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 638 days.

(21) Appl. No.: 16/961,142

(22) PCT Filed: Jan. 9, 2019

(86) PCT No.: PCT/US2019/012895
§ 371 (c)(1),
(2) Date: Jul. 9, 2020

(87) PCT Pub. No.: WO2019/139984
PCT Pub. Date: Jul. 18, 2019

(65) Prior Publication Data
US 2020/0344695 A1 Oct. 29, 2020

Related U.S. Application Data

(60) Provisional application No. 62/691,799, filed on Jun. 29, 2018, provisional application No. 62/616,977, filed on Jan. 12, 2018.

(51) Int. Cl.
*H04W 52/02* (2009.01)
*H04W 84/12* (2009.01)
*H04W 88/06* (2009.01)

(52) U.S. Cl.
CPC ... *H04W 52/0274* (2013.01); *H04W 52/0219* (2013.01); *H04W 52/0222* (2013.01);
(Continued)

(58) Field of Classification Search
CPC ...... H04W 52/02; H04W 84/12; H04W 88/06
See application file for complete search history.

(56) References Cited

U.S. PATENT DOCUMENTS

| 9,521,609 B2 | 12/2016 | Kim et al. | |
| 2003/0123405 A1 * | 7/2003 | del Prado | H04W 16/14 370/252 |

(Continued)

FOREIGN PATENT DOCUMENTS

| EP | 3349535 A1 * | 7/2018 | ............ H04W 28/06 |
| WO | 2016160306 A1 | 10/2016 | |
| WO | 2016191605 A1 | 12/2016 | |

OTHER PUBLICATIONS

Kim et al., "Duty Cycle Mode STAs PS Follow Up," IEEE 802.11-17/1356r4 (Sep. 10, 2017).
(Continued)

*Primary Examiner* — Mohammad S Anwar
(74) *Attorney, Agent, or Firm* — Volpe Koenig

(57) ABSTRACT

Methods and apparatuses are described herein for rediscovery and medium access for wake-up radios. For example, a wireless transmit receive unit (WTRU) may receive, via a first transceiver, a frame that includes a wake-up radio (WUR) operation element having a first counter value. The WTRU may deactivate the first transceiver and activate a second transceiver, wherein the first transceiver enters into a doze state and the second transceiver is in an awake state. The WTRU may then receive, via the second transceiver in the awake state, a WUR frame that includes a second counter value indicating an update of a plurality of basic sewer set (BSS) parameters associated with the first transceiver. On a
(Continued)

condition that the second counter value is different than the first counter value, the WTRU may activate the first transceiver to update the plurality of BSS parameters, wherein the first transceiver enters into an awake state.

10 Claims, 13 Drawing Sheets

(52) U.S. Cl.
CPC .... *H04W 52/0229* (2013.01); *H04W 52/0216* (2013.01); *H04W 84/12* (2013.01); *H04W 88/06* (2013.01)

(56) References Cited

U.S. PATENT DOCUMENTS

| | | | |
|---|---|---|---|
| 2014/0003315 A1 | 1/2014 | Liu | |
| 2014/0003399 A1 | 1/2014 | Liu | |
| 2015/0078229 A1 | 3/2015 | Choi et al. | |
| 2015/0110093 A1* | 4/2015 | Asterjadhi | H04W 74/008 370/338 |
| 2015/0249953 A1 | 9/2015 | Kim et al. | |
| 2016/0353382 A1 | 12/2016 | Xue | |
| 2016/0374019 A1 | 12/2016 | Park et al. | |
| 2017/0026907 A1 | 1/2017 | Min et al. | |
| 2017/0332327 A1 | 11/2017 | Fang et al. | |
| 2019/0281551 A1 | 9/2019 | Kim et al. | |

OTHER PUBLICATIONS

Gan et al., "Power save state transition," IEEE 802.11-17/1369r3 (Sep. 10, 2017).
Huang et al., "WUR Action Frame Format," IEEE 802.11-17/0684r0 (Jan. 11, 2018).
Yang et al., "WUR Security Proposal," IEEE 802.11-17/0660r2 (May 8, 2017).
Aboul-Magd, "802.11 HEW SG Proposed PAR," IEEE 802.11-14/0165r0 (Jan. 22, 2014).
Aboul-Magd, "802.11 HEW SG Proposed PAR," IEEE 802.11-14/0165r1 (Mar. 17, 2014).
Aboul-Magd, "IEEE802.11 HEW SG Proposed CSD," IEEE P802.11 Wireless LANs, IEEE 802.11-14/0169r1 (Mar. 18, 2014).
Aboul-Magd, "IEEE 802.11 HEW SG Proposed CSD," IEEE P802.11 Wireless LANs, IEEE 802.11-14/0169r0 (Jan. 22, 2014).
Azizi et al., "A PAR Proposal for Wake-up Radio," IEEE P802.11 Wireless LANs, IEEE 802.11-16/1045r06 (Jul. 2016).
Azizi et al., "Wake-Up Receiver Usage Scenarios and Applications," IEEE 802.11-16/xxxxr0 (IEEE 802.11-16/0974r0) (Jul. 2016).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D2.0 (Oct. 2017).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D3.0 (Jun. 2018).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 9: Wake-Up Radio Operation, IEEE P802.11ba/D1.0 (Sep. 2018).
Gan et al., "BSS parameters update notification," IEEE 802.11-17/1368r2 (Sep. 2017).

Huang, "Specification Framework for TGba," IEEE P802.11 Wireless LANs, IEEE 802.11-17/0575r8 (Dec. 2017).
IEEE P802.11 ad-2012, IEEE Standard for Information Technology—Telecommunications and Information Exchange Between Systems—Local and Metropolitan Area Networks—Specific Requirements—Part 11 Wireless LAN Medium Access Control (MAC) and Physical Layer (PHY) Specifications—Amendment 3 Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Kim et al., "AP re-discovery by WUR STA," IEEE 802.11-17/0657r1 (May 2017).
Kim et al., "Duty cycle mode STA's PS follow-up," IEEE 802.11-17/1356r4 (Sep. 2017).
Levy, "AANI SC Agenda Jan. 8, 2018 Teleconference," IEEE 802.11-18/0062r1 (Jan. 2018).
Liu et al., "On Re-discovery Problems in WUR WLAN," IEEE 802.11-17/0027r4 (Jan. 2017).
Wang et al., "Group Delay for Group Addressed Wake Up Frames," IEEE 802.11-18/1158r0 (Jul. 2018).
Wang et al., "Proposed Spec Text for Updating the Value of BSS Parameter Update Counter," 802.11ba Draft Specification, IEEE 802.11-18/1157r11 (Jul. 2018).
Wang et al., "STA wake up using BSS Parameter Update Counter," IEEE 802.11-18/0830r0 (May 2018).
Wang et al., "STA wake up using BSS Parameter Update Counter," IEEE 802.11-18/0830r1 (May 2018).
Kim et al., "Duty Cycle Mode STAs PS Follow Up," IEEE 802.11-17/1356r5 (Nov. 15, 2017).
Office Action issued in related Taiwanese Patent Application No. 111139320, dated Jun. 12, 2023.
Search Report issued in related Taiwanese Patent Application No. 111139320, dated Jun. 12, 2023.
Gan et al., "BSS Parameters Update Notification," IEEE 802.11-17/1368r2, (Sep. 10, 2017).
Kim et al., "WUR frame format Follow-up," IEEE 802.11-17/1638r3, (Nov. 16, 2017).

(56) References Cited

OTHER PUBLICATIONS

Jadhi et al., "Proposed spec text for D0.1," IEEE 802.11-18/0165r2, (Jan. 1, 2018).

* cited by examiner

METHOD FOR EFFICIENT REDISCOVERY AND MEDIUM ACCESS FOR WAKE-UP RADIOS

CROSS REFERENCE TO RELATED APPLICATION

This application is the U.S. National Stage, under 35 U.S.C. § 371, of International Application No. PCT/US2019/012895 filed Jan. 9, 2019, which claims the benefit of U.S. Provisional Application No. 62/616,977, filed on Jan. 12, 2018, and U.S. Provisional Application No. 62/691,799, filed on Jun. 29, 2018, the contents of which are hereby incorporated by reference herein.

BACKGROUND

A wake-up radio (WUR) receiver may operate as a companion radio to the primary connectivity radio (PCR) to receive a wake-up signal or wake-up packet. The wake-up signal or wake-up packet may carry control information and have active receiver power consumption of less than one milliwatt (mW). Receiving a wake-up signal or wake-up packet by the WUR receiver may cause the PCR to wake up from sleep. For example, a wake-up signal transmitted from an access point (AP) triggers a wireless transmit/receive unit (WTRU) equipped with the WUR receiver to wake up from the sleep mode and start reception activities using the PCR. However, if the AP lost power or stored information on existing WTRUs, the WTRUs previously associated with the AP may not be aware of the fact that the AP does not have existing WUR information for the WTRUs. Furthermore, when multi-cast wake-up signals are used to wake up a number of WTRUs, there may be congestion at the wireless medium because the WTRUs being woke up attempt to access the medium around similar time. Thus, methods and apparatuses that allow the WTRUs to efficiently rediscover the AP and/or reliably access the medium for WURs are needed.

SUMMARY

Methods and apparatuses are described herein for efficient (re)discovery and medium access for wake-up radios. For example, a wireless transmit receive unit (WTRU) may receive, via a first transceiver, a frame that includes a wake-up radio (WUR) operation element having a first counter value. The received frame may be a beacon frame or a WUR action frame such as a WUR mode setup frame. The WTRU may maintain a counter variable (or counter field) and update the value of the counter variable to the first counter value in the WUR operation element. After the negotiation procedures for WUR parameters with an access point (AP) are completed, the WTRU may deactivate the first transceiver and activate a second transceiver, thereby the first transceiver entering into doze state and the second transceiver being in awake state to save the WTRU's power consumption. While the second transceiver is in the awake state, the WTRU may receive, via the second transceiver, a WUR frame that includes a second counter value indicating that an update of a plurality of basic server set (BSS) parameters associated with the first transceiver's BSS is available. The WUR frame may be a broadcast WUR wakeup frame. If the second counter value is different than the first counter value, the WTRU may activate the first transceiver in the doze state to update the plurality of BSS parameters. The first transceiver may then enter into awake state and receive, from the AP, a beacon frame that includes the plurality of BSS parameters. The first transceiver may be a primary connectivity radio (PCR) and the second transceiver may be a companion radio, wake-up radio or a wake-up radio receiver.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
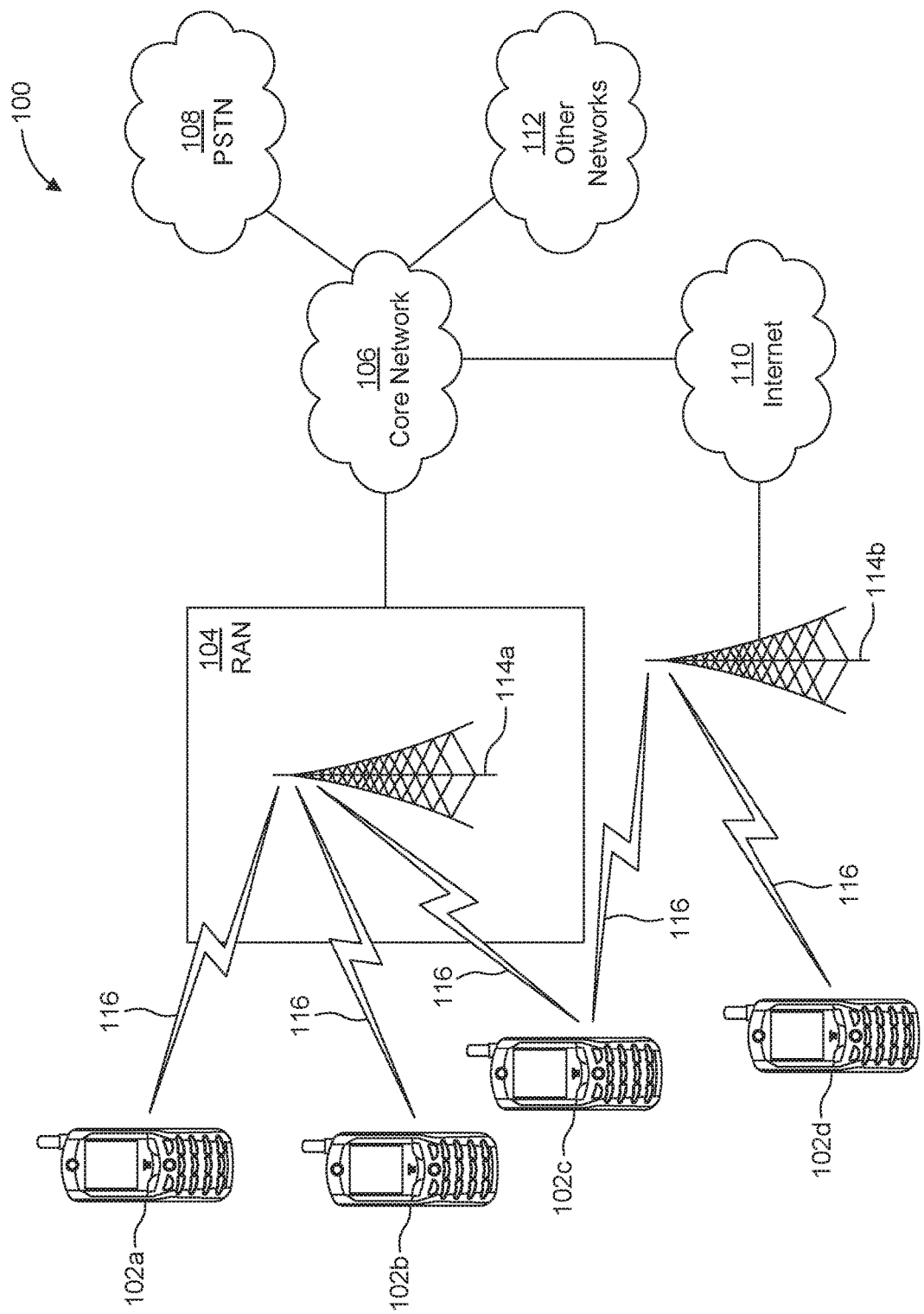
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
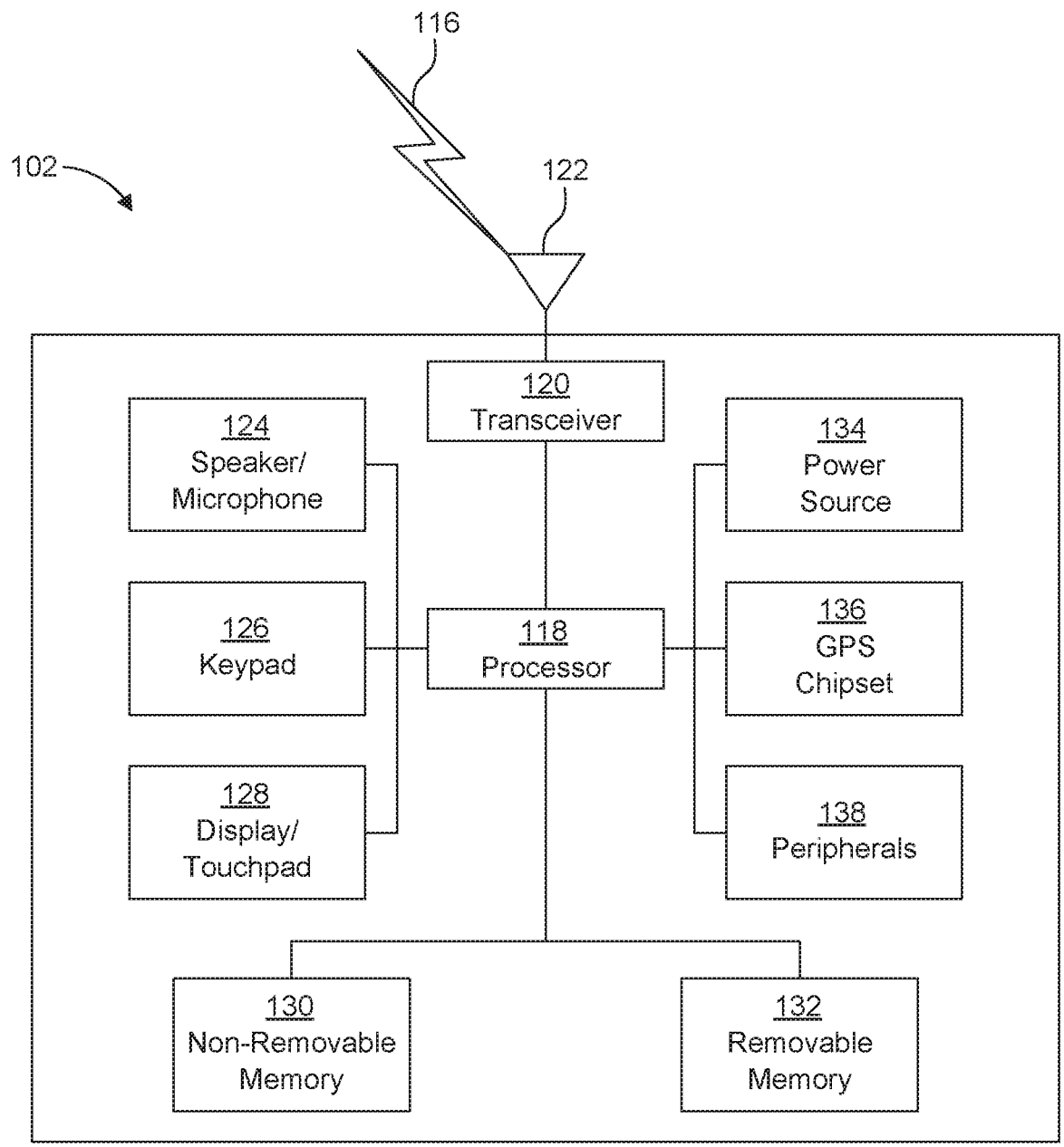
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) or an access point (AP) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

Although it not shown in FIG. 1B, the transceiver 120 may comprise a main transceiver (or a primary connectivity radio) and a secondary transceiver (or a wake-up radio transceiver) that are operatively coupled to the processor 118 and the transmit/receive element 122.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
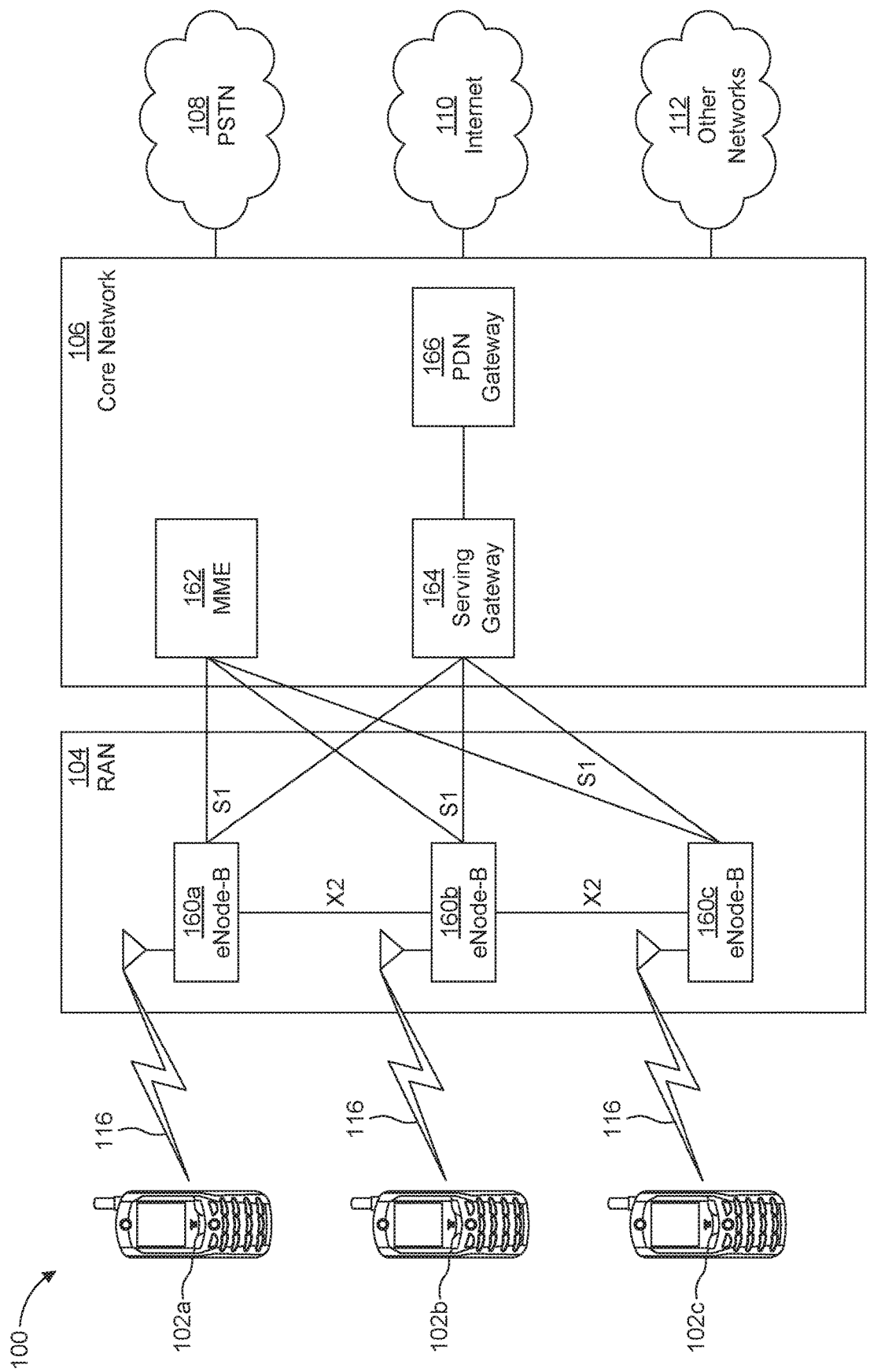
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
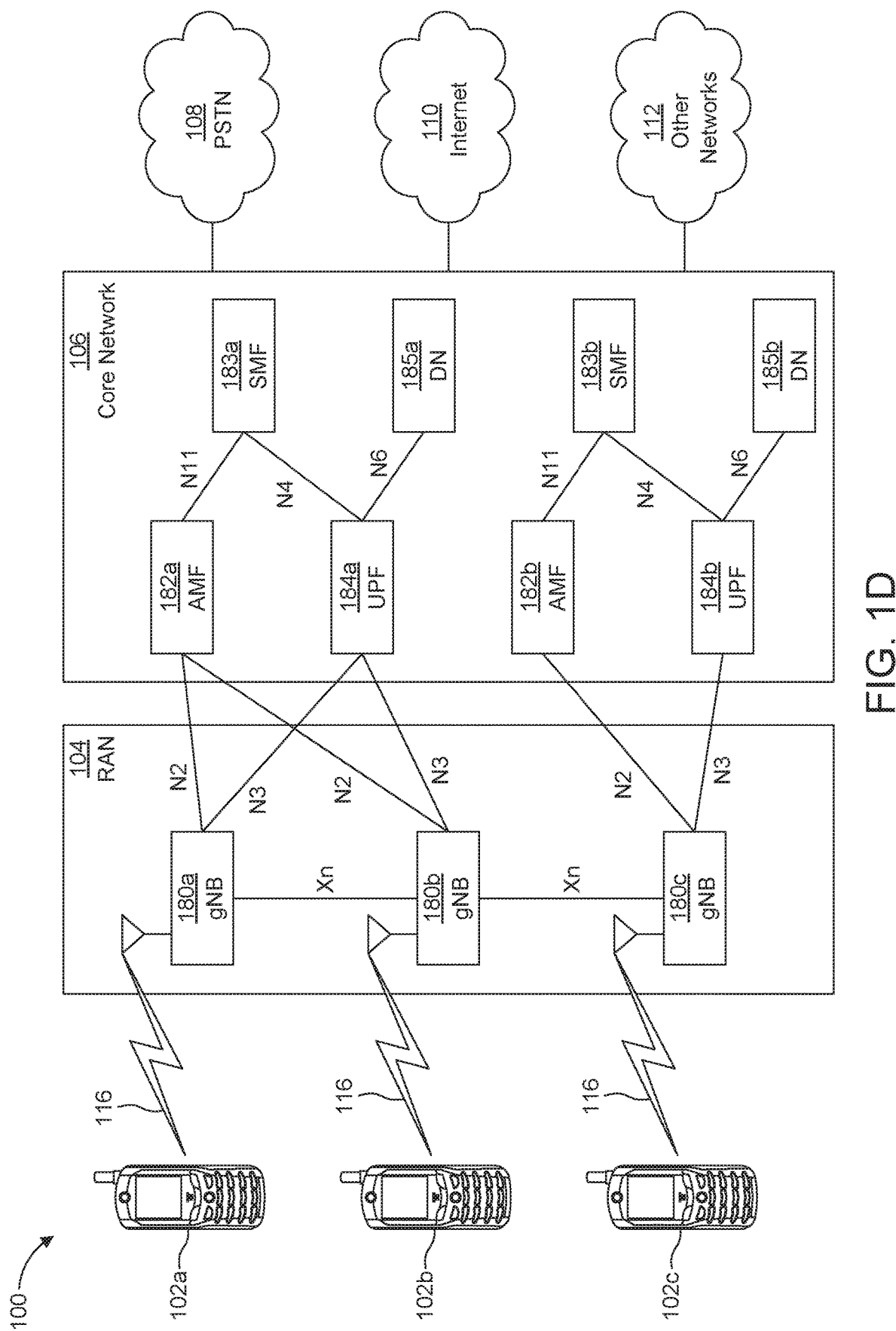
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

A WLAN in Infrastructure Basic Service Set (BSS) mode has an Access Point (AP) for the BSS and one or more stations (STAs) associated with the AP. An AP may be interchangeable with base station as it is discussed herein. Also, a STA may be interchangeable with WTRU as discussed herein. The AP typically has access or interfaces to a Distribution System (DS) or another type of wired/wireless network that carries traffic in and out of the BSS. Traffic to STAs that originate from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is may be considered peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP, and/or STAs, communicating directly with each other. This mode of communication is referred to as an "ad-hoc" mode of communication.

Using the 802.11ac infrastructure mode of operation, the AP may transmit a beacon on a fixed channel, usually the primary channel. This channel may be 20 MHz wide, and may be the operating channel of the BSS. This channel may also be used by the STAs to establish a connection with the AP. The fundamental channel access mechanism in an 802.11 system may be Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, may be passed through a segment parser that divides it into two streams. IFFT, and time domain, processing may be done on each stream separately. The streams may then be mapped on to the two channels, and the data is transmitted. At the receiver, this process is reversed, and the combined data may be sent to the MAC.

Sub 1 GHz modes of operation may be supported by 802.11af, and 802.11ah. For these specifications the channel operating bandwidths, and carriers, may be reduced relative to those used in 802.11n and 802.11ac. 802.11af may support 5 MHz, 10 MHz and 20 MHz bandwidths in the TV White Space (TVWS) spectrum, and 802.11ah may support 1 MHz, 2 MHz, 4 MHz, 8 MHz, and 16 MHz bandwidths using non-TVWS spectrum. A possible use case for 802.11ah is support for Machine Type Control (MTC) devices in a macro coverage area. MTC devices may have limited capabilities including only support for limited bandwidths, but also include a requirement for a very long battery life.

WLAN systems which support multiple channels, and channel widths, such as 802.11n, 802.11ac, 802.11af, and 802.11ah, include a channel which is designated as the primary channel. The primary channel may, but not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g., MTC type devices) that only support a 1 MHz mode even if the AP, and other STAs in the BSS, may support a 2 MHz, 4 MHz, 8 MHz, 16 MHz, or other channel bandwidth operating modes. All carrier sensing, and NAV settings, depend on the status of the primary channel (i.e., if the primary channel is busy, for example, due to a STA supporting only a 1 MHz operating mode is transmitting to the AP, then the entire available frequency bands are considered busy even though majority of it stays idle and available).

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

IEEE 802.11 High Efficiency WLAN (HEW) may be modified to enhance the quality of service of all users experience for a variety of wireless users in many usage scenarios including high-density scenarios in the 2.4 GHz and 5 GHz band. New use cases which support dense deployments of APs, and STAs, and associated Radio Resource Management (RRM) technologies may be implemented with HEW.

HEW may apply to emerging usage scenarios such as data delivery for stadium events, high user density scenarios such as train stations, or enterprise/retail environments, and may also address an increased dependence on video delivery, and wireless services for medical applications.

In some scenarios, measured traffic for a variety of applications may have likelihood for short packets, and there may be network applications that may also generate short packets. These scenarios may include, but are not limited to: virtual office, TPC ACK, video streaming ACK, Device/Controller (e.g., mice, keyboards, game controls, etc.), access (e.g., probe request/response), network selection— (e.g., probe requests and/or ANQP), and/or network management (e.g., control frames). 802.11ax may have Multi-User (MU) features that include Up Link (UL) and Down Link (DL) Orthogonal Frequency Division Multiple Access (OFDMA) and UL and DL Multi User Multiple In Multiple Out (MU-MIMO). Designing and defining a mechanism for multiplexing UL random access for different purposes may be discussed herein.

A wake-up radio (WUR) may be used with a PHY and MAC modification to procedure to provide enhanced low power operations of 802.11 devices. The MAC and PHY modifications may enable operations of a WUR.

WUR may include operating bands of 2.4 GHz, 5 GHz and may be extended to Sub 1 GHz. A WUR device may operate as a companion radio to the primary connectivity radio, which is used to transmit regular 802.11 packets or cellular packets. A WUR may transmit packets that carry control information and have active receiver power consumptions of less than one milliwatt (mW). Receiving a wake-up packet by the WUR may cause the primary connectivity radio to wake up from sleep. The WUR is expected to have a range that is at least the same as the range of the primary connectivity radio operating on at least a 20 MHz payload bandwidth. Both AP and non-AP STAs may have WUR as a companion radio. Some usage cases for WUR include, but are not limited to: IoT devices, low power operation for smart phones, quick message/incoming call notification scenario, quick status query/report, configuration change scenario, and/or quick emergency/critical event report scenario. The terms access point (AP) and base station (BS) may be used interchangeably throughout this disclosure.

WUR STA/AP rediscovery may be associated with 802.11ba or cellular network such as New Radio (NR), and may address problems associated with STA rediscovery by an AP after the AP has been reset or replaced, and/or problems associated with AP rediscovery by a STA where the STA may wake up if it cannot detect WUR beacons for a certain period of time and communicate with its AP or discover other APs.

As used herein, the term primary connectivity radio (PCR) may refer to a main radio with capability to transmit and receive one or more physical layer protocol data units (PPDU) via various channels. The term wake-up radio (WUR) may refer to a companion radio to a PCR with the capability to transmit or receive one or more WUR PPDUs. As used herein, the terms wake-up radio, wake-up radio receiver, wake-up radio transceiver, wake-up radio device, companion transceiver, companion receiver, companion radio, passive receiver, passive transceiver, zero-energy (ZE) receiver, ZE transceiver, secondary transceiver or any combination thereof may be used interchangeably throughout this disclosure. The terms primary connectivity radio, primary connectivity transceiver, main receiver, main transceiver, main modem, primary transceiver or any combination thereof may be used interchangeably throughout this disclosure. As used herein, the terms wake-up radio (WUR) packet, WUR signal, WUR frame, or any combination thereof may be used interchangeably throughout this disclosure.

Figure 2:
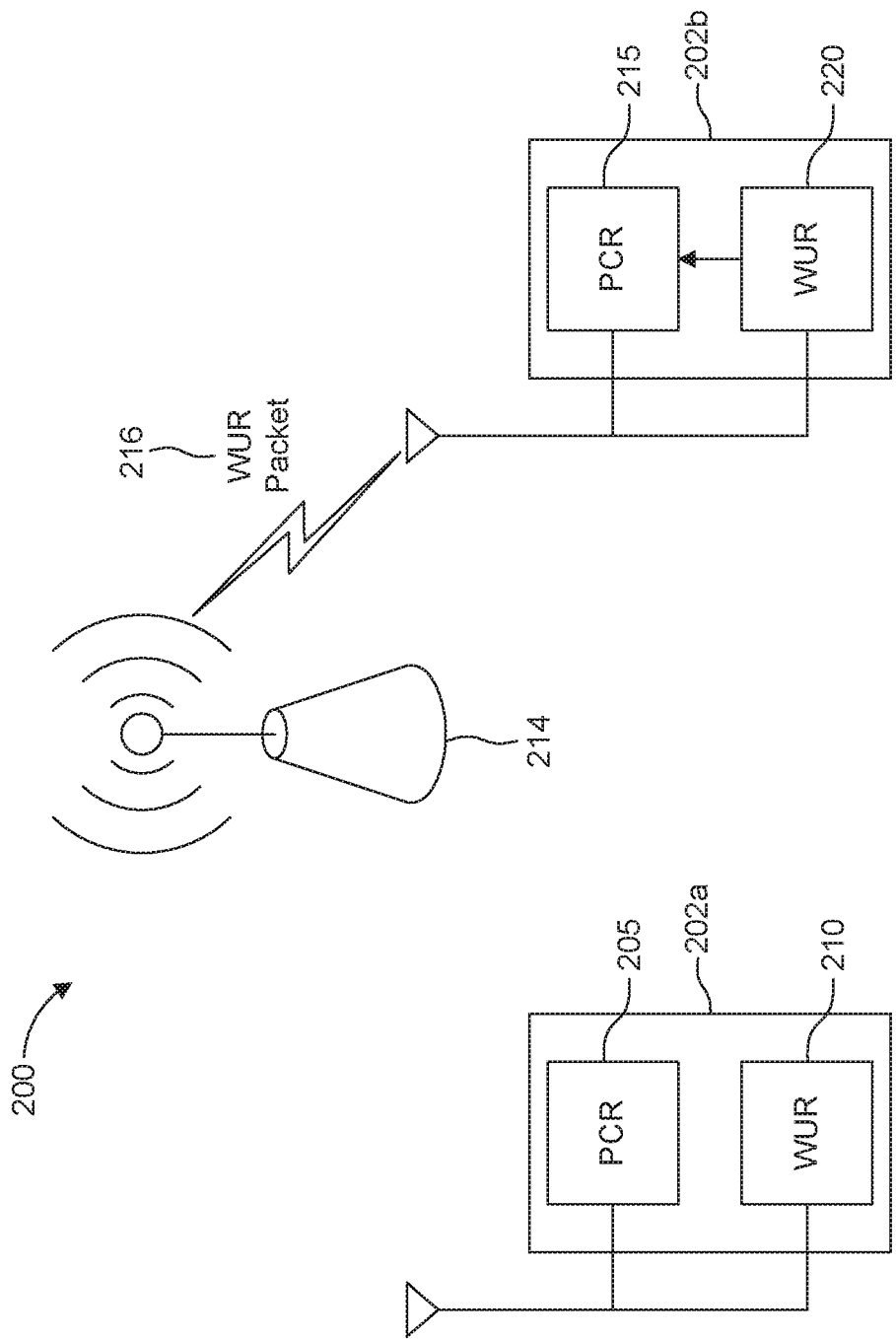
FIG. 2 is a system diagram illustrating an example wake-up radio (WUR) system in which one or more disclosed embodiments may be implemented.

FIG. 2 illustrates an example wake-up radio (WUR) system 200 in which one or more disclosed embodiments may be implemented. As illustrated in FIG. 2, WTRUs 202a, 202b (e.g., IoT devices) may include WUR transceivers 210, 220 operatively coupled to primary connectivity radios (PCRs) 205, 215. The PCRs 205, 215 may be designed to transmit and receive large amount of data, for example, at Mb/s or even Gb/s. The WUR transceivers 210, 220 may be designed to transmit and receive small amount of data with very low power consumption (e.g., less than 1 mW). For example, as illustrated in FIG. 2, the WTRU 202a may turn off (or deactivate) its PCR 205 transceiver and turn on (or activate) WUR transceiver 210 when the WTRU 202a is waiting for a WUR packet 216. While the PCR 205 is off (or in doze/sleep state) and the WUR is on (or in awake/active state), the WTRUs 202a, 202b may receive, via the WURs 210, 220 a wake-up radio (WUR) packet 216 from the AP 214 to wake up or know when to expect to receive the WUR packet 216 from the AP 214 to wake up. For example, upon receiving the WUR packet 216 at the WUR transceiver 220, the WTRU 202b may turn on the PCR 215 to further transmit or receive data to or from the AP 214.

If an existing AP is replaced by a new AP, it may be impractical to manually reset all WUR transceiver (or WUR devices) associated with the existing AP, especially when STAs equipped with the WUR transceivers are currently in WUR mode. If a WUR AP lost power, it may lose stored information on existing STAs, for example, STA's wake-up IDs (WIDs), WUR schedules and duty cycles, or the like. For the previously associated STAs, these STAs may be in WUR mode and may not be aware that the WUR AP does not have existing WUR information.

One or more embodiments may provide a re-discovery procedure to ensure that WUR AP and STAs can re-discover each other quickly and efficiently, and WUR scheduling and information can be re-established as soon as possible to conserve the energy for STAs with WUR transceiver.

A WUR AP may be lost unexpectedly due to power loss, malfunction, damage, theft, or other reasons. In some cases, the WUR AP may return to normal operations, but may have lost existing information such as STAs and WUR STAs that are associated with it, WUR parameters such as WID, WUR group ID (GID), WUR duty cycles, and/or the like. In some other cases, a new AP may need to be brought in to replace an old AP with the new AP may not be aware of the existing WUR schedules, duty cycles or other parameters/information. The WUR STAs that are associated with the WUR AP that may be lost, particularly those that are in WUR mode may not be aware of the loss of WUR parameters at the AP, and continue with its scheduled WUR operations. The WUR STAs may not be monitoring all WUR beacons, or may only monitor WUR beacons during certain periods, such as a scheduled duty cycle. These WUR STAs may need to be woken up and either have a new association with the same or a new AP and/or negotiate new WUR schedules and parameters as described above.

In one embodiment for rediscovery of a lost WUR AP, pass phrases or other security related piece of information, may be used to wake up a WUR STA. A WUR AP may be configured or pre-configured with one or more pieces of security information, such as a pass phrase, or a pass code. Such a pass phrase or pass code may be used for emergency recovery by the same or another AP, with the same or different BSSID, and/or SSID. Such an emergency recovery may also be used as an encryption key, or for other security purposes. The emergency recovery information may also be a combination of one or more of a specific GID and/or security key, or pass phrases.

The WUR AP may include the emergency recovery information in one or more frames such as management frames, action frames, WUR frames sent to a WUR STA that has authenticated or associated with itself. For example, the emergency recovery information may be included in (re) association responses or in WUR actions frames, or in other types frames such as beacons or short beacons.

The emergency recovery information may also be included as a part of the WUR negotiation set up process and/or WUR mode suspend negotiations.

The emergency recovery information may be saved in a location in the AP such as its hard disk or in the cloud to ensure that it will not be lost due to power outage.

When a WUR AP is reset and resumes operations, it may include the emergency recovery information in a wake-up frame (or WUR frame) targeted to one or more WUR STAs that may be in the WUR mode. For example, the wake-up frame (or WUR frame) may be sent to a particular GID, which is associated with a general wake-up, or associated with WUR reset. The GID may be combined with one or more pass phrases, encryption keys, or pieces of security information to indicate that it is associated with a general wake-up, or associated with a WUR reset (i.e., when all STAs must wake up to re-establish WUR mode negotiations, including one or more of WUR channels/bands, WUR rates, WUR duty cycles, etc.). The wake-up packet (WUP) may contain or embed one or more parts of the security information, such as a BSSID, pass code, or SSID. The WUP may contain reasons for wake-up such as "WUR reset" or "BSS-wide reset", which may indicate that the STAs need to wake up. The WUP may be sent or repeated over all available WUR channels, WUR bands, and for a period that may be sufficient to wake up all WUR STAs that are currently in WUR mode.

A replacement WUR AP may use the same emergency recovery information known to the operator or recovered from the cloud or through other methods to wake up the WUR STAs that are associated with the previous WUR AP.

The AP may indicate in one or more primary connectivity radio (PCR) frames, such as beacons, short beacons, or broadcast WUR Action frames that it has been restarted. The PCR fames may refer to frames that are transmitted or received via the PCR and may include management frames or action frames.

When a WUR STA in WUR mode receives a WUP (e.g., during an ON duration of its WUR duty cycle), it may wake up based on one or more conditions. One condition may be that the WUP is targeted at the WID of the WUR STA. Another condition may be that the WUP is targeted at a GID which the WUR STA is associated with and the BSSID embedded in the WUP indicates the WUR STA's BSSID. Another condition may be that the security information in the WUP is verified to be authentic. Another condition may be that the WUP is targeted at a GID that is associated with "general wake-up" or "BSS-wide reset", or the WUP is targeted to a multi-cast/broadcast group and it may contain reasons for wake-up to be "general wake-up" or "BSS-wide reset". And another condition may be that the BSSID embedded in the WUP indicates the WUR STA's BSSID.

The WUR STA may wake up, and may send a UL packet to the AP on their PCRs according to WUR procedures. The WUR AP may then send a disassociation frame. In one example, the WUR AP may send a broadcast disassociation frame to all STAs, for example by invoking a disassociate.request primitive using a broadcast MAC address and a reason code for "STA reset". In another example, when a WUR STA is woken up for the reason of "WUR reset" or "BSS-wide reset", it may wake up and send a disassociation frame to the WUR AP. In yet another example, the WUR STA may disassociate from the AP after a time out after waking up.

A replacement WUR AP may indicate in one or more PCR frames that it is a replacement AP for the previous AP, for example, in beacons, short beacons, broadcast WUR Action frames, FILS discovery frames, etc.

The WUR STA may choose to (re)associate with the WUR AP, and then conduct WUR negotiations to establish WUR parameters. The WUR STA may then request to enter WUR mode and may turn off or deactivate its PCR.

After each reset, the AP may refresh the emergency recovery information, such as a new pass phrase, new pass code, new GID, or the like.

Figure 3:
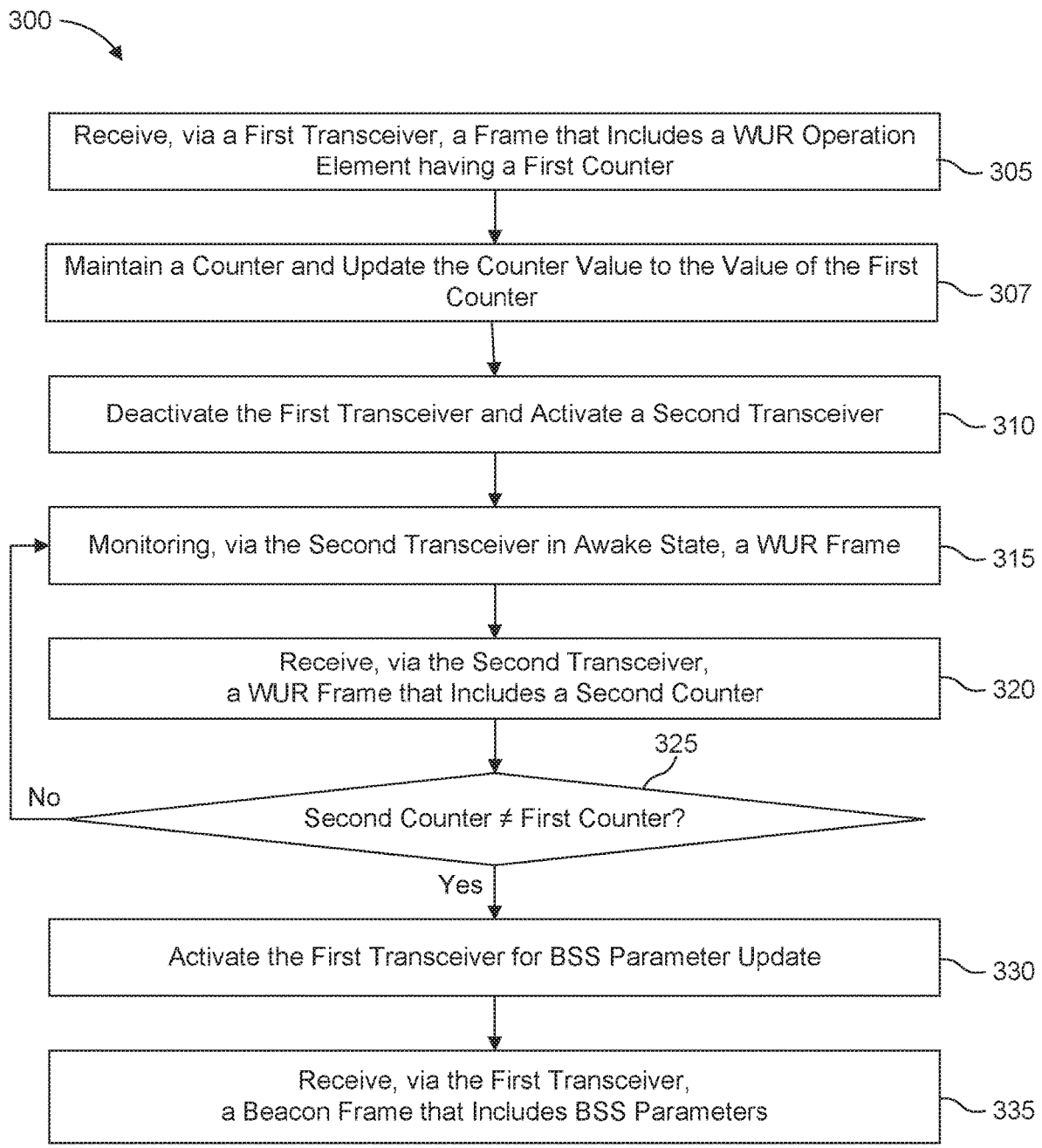
FIG. 3 is a diagram illustrating an example (re)discovery procedure using a basic service set (BSS) counter.

FIG. 3 illustrate an example procedure 300 using a basic service set (BSS) counter, which may be used in combination with any of other embodiments described herein. At step 305, a WTRU or STA equipped with one or more transceivers may receive a frame that includes a first counter. The one or more transceivers may include a first transceiver for PCR and a second transceiver for WUR. The frame may be received via the first transceiver (i.e. PCR) and may be a management frame or an action frame described above. Examples of the management frames may include, but are not limited to, a beacon frame, an association request frame, an association response frame, a reassociation request frame, a reassociation response frame, a probe request frame, and a probe response frame. Examples of the action frame may include, but are not limited to, a WUR mode setup frame, WUR mode teardown frame, or the like. The frame received via the first transceiver (i.e. PCR) may be a management frame such as a beacon frame. The frame received via the first transceiver (i.e. PCR) may be an action frame or WUR action frame such as a WUR mode setup frame.

Regardless of whether the WTRU is in the negotiation procedure or not, the received management frame and/or the received action frame (e.g., the beacon frame and/or the WUR mode setup frame) may include a WUR operation element in the frame as described above. The WUR operation element may include a set of parameters necessary to support the WUR operation. For example, the WUR operation element may include WUR parameter which includes a counter subfield. The counter subfield may include the first counter value of step 305. The first counter value may be a current basic serve set (BSS) counter value or an updated BSS counter value.

At step 307, the WTRU or STA that locally stores and maintains a counter variable may update the value of the counter variable to the value of the first counter in the WUR operation element. The value of the first counter may be the latest counter value included in the WUR operation element in a beacon or WUR mode setup frame.

After the negotiation procedures are completed, the WTRU may turn off (or deactivate) the first transceiver (i.e. PCR) and turn on (or activate) a second transceiver (i.e. WUR) at step 310 to save power. It should be noted that the second transceiver may be turned on (or activated) after the first transceiver is turned off (or deactivated) or may already be turned on (or activated) before the first transceiver is turned off (or deactivated). Once the first transceiver is turned off, the first transceiver may enter into doze (or sleep) state. The first transceiver may be in power save (PS) mode. The second transceiver may be in active mode to receive wake-up signals.

Specifically, when the WTRU is in WUR mode, the second transceiver of the WTRU may be in awake state during the WUR duty cycle schedule agreed between the AP and the WTRU.

At step 315, the WTRU may monitor, via the second transceiver in the awake state, a WUR frame or WUR packet. At step 320, the WTRU may receive, from the AP, via the second transceiver in the awake state, a WUR frame that includes a second counter value.

The WUR frame received at step 320 may be a WUR wake-up (i.e. Type=1) frame. The WUR wake-up frame may include a field such as a TD control field. The TD control field may include a counter subfield. The counter subfield may include the second counter value of step 320. The second counter value may be a BSS counter value. The second counter value may indicate whether any critical update to parameters associated with the AP or the first transceivers (or PCR's) BSS has occurred. Alternatively or additionally, if the WUR wake-up frame is broadcasted, the WUR wake-up frame may include a BSS update counter field that includes the second counter value of step 320. The second counter value in the BSS update counter field may indicate whether any critical update to the AP or the first transceiver's (PCR's) BSS parameters associated with the AP has occurred.

The AP may maintain the BSS parameter update counter. The AP may increase or decrease the value of the BSS parameter update counter, for example, when a critical update occurs to any of the elements inside the beacon frame. The AP may include the current value (i.e. second counter value) of the BSS parameter update counter in the counter subfield of the TD Control field in transmitted broadcast/multicast/unicast WUR wake up frames.

At step 325, the WTRU may determine whether the first counter value and the second counter value are different or not. If the first counter value and the second counter value is not different (i.e. same), the WTRU may determine that there is no critical update to the AP or the BSS parameters associated with the AP. However, if the first counter value is different from the second counter value, the WTRU may determine that there is a critical update to the AP or the BSS parameters associated with the AP.

Once the WTRU determines that there is a critical update to the AP or the BSS parameters associated with the AP, at step 330, the WTRU may wake up the first transceiver by activating the first transceiver. The first transceiver may then enter into awake or active state to update the BSS parameters associated with the AP and/or to receive further information related to the update. For example, at step 335, the WTRU may receive a beacon frame (i.e. PCR beacon) via the first transceiver to update the BSS parameters. The WTRU may also send a response frame to the AP using its first transceiver (i.e. PCR component) after receiving the WUR wake-up frame with address field set to the WID that identifies the WTRU.

In one embodiment for rediscovery, a BSS counter in a WUR frame or beacon may be used to wake up WUR STAs or WUR WTRUs. A particular BSS counter value may be used to indicate that a WUR AP is freshly restarted. For example, such a BSS counter value may be all "0"s or all "1"s or a pre-defined value. Such a value may be used in any WUR frames as a result of changing BSS settings. Such a value may also be included in a WUR action frame, such as a WUR response frame. In addition, a WUR action frame, such as a WUR response frame may include the value of "current WUR BSS counter" so that the WUR STA is aware of the current setting of the WUR BSS counter value used in the WUR beacons or beacons at the time that it is entering the WUR mode. The current BSS counter value may be derived from or based on another counter, such as access point—connectivity service network (AP-CSN), or other beacon or BSS setting related counters used in the BSS.

After a WUR AP restarts, it may set the value of the BSS counter value to the value that indicates a fresh restart, or indicate that "WUR reset" or "BSS-wide reset" (e.g., in a WUR beacon or a broadcast/multicast/unicast WUR frame). In another example, the WUR AP may set the BSS Counter randomly; in order to guarantee that all STAs will be woken up for new BSS settings, the WUR AP may increase the BSS counter one or more times after its restart, without requiring that a BSS setting has been updated.

A WUR AP may set the BSS counter using the BSS counter value in the WUR beacons to wake up all WUR STAs that are currently in WUR mode. Additionally or alternatively, a wake-up frame may be defined for WUR reset/BSS Reset. The wake-up frame may indicate the BSS counter values. The WUR beacons and/or WUR reset frames may be embedded with the BSSID of the AP. The WUR beacon or WUR frames may be sent or repeated over all available WUR channels, WUR bands, and for a period that may be sufficient to wake up all WUR STAs that are currently in WUR mode.

The AP may indicate in one or more PCR frames, such as beacons, short beacons, broadcast WUR action frames, that it has been restarted. The WUR AP may include the WUR BSS counter in the PCR frames.

When a WUR STA in WUR mode receives a wake-up frame or wake-up packet (WUP), for example during a on duration of its WUR duty cycle, it may wake up based on one or more conditions. One such condition may be that the WUR beacon contains a different value for the BSS counter than the value contained in the last WUR beacon that it received, or a different value than the value indicated in the WUR negotiation process, or a different value derived from existing counters when it entered the WUR mode, or a value indicating "AP restart" and/or "BSS reset" and/or "WUR reset". Another condition may be that the wake-up frame indicates that the AP has restarted and/or BSS/WUR reset. Another condition may be that the security information included is verified. Another condition may be that the embedded BSSID/SSID is the desired BSSID/SSID. The WUR STA may wake up, and may send a UL packet to the AP on their PCRs according to WUR procedures. The WUR AP may then send a disassociation frame. In one example, the WUR AP may send a broadcast disassociation frame to all STAs, for example by invoking a disassociate.request primitive using a broadcast MAC address and a reason code for "STA reset" or "BSS Reset". In another example, when a WUR STA is woken up for the reason of "WUR reset" or "BSS-wide reset" which may be indicated by a particular BSS counter value or by the type of wake up frame, the WUR STA may wake up and send a disassociation frame to the WUR AP. In yet another example, the WUR STA may disassociate from the AP after a time out after waking up.

The WUR STA may choose to (re)associate with the WUR AP, and then conduct WUR negotiations to establish one or more WUR parameters, and then the WUR STA may request to enter WUR mode and may turn off its PCR.

In one embodiment, an AP may perform one or more steps to indicate the current BSS counter value or the current BSS update counter value to the STAs. An AP may indicate the current value of the counter subfield that is included in the latest wake-up packet, such as the last broadcast wake-up packet, using an element in a beacon or WUR action frame that is transmitted using the AP's PCR. For example, such an element may be the WUR operation element, or WUR mode element or WUR capability element. Such an element may be included in the beacon frame, short beacon frame, and/or WUR mode setup frame. Additionally or alternatively, the current value of the counter subfield that is included in the last wake-up packet, such as the latest broadcast wake-up packet, may be included directly in the beacon, and/or WUR action frame, such as WUR mode setup frame, and/or other type of management frames, control frames, data frames, action frames or extension frames. An AP may include a WUR operation element in WUR action frames, such as WUR mode setup frames, when the WUR operation element has been recently updated (e.g., when the counter field has been increased, when the WUR operation channel has changed, when the WUR Beacon offset has changed, when WUR beacon periods change, or the like).

A non-AP STA and/or AP that is capable of WUR operations may maintain a counter variable. Additionally or alternatively, a non-AP STA and/or AP that has dot11WUROptionImplemented set to true may maintain a counter variable or a counter field. The STA may update the value of the counter variable or counter field to the latest counter value received in a frame using its PCR component, such as a beacon, or a WUR action frame, such as WUR mode setup frame. The latest counter value may be contained in the WUR operation element, WUR mode element, or WUR capability element as described above.

A non-AP STA that receives the counter subfield of the TD control field in a WUR wake-up frame that contains a value that is different from its counter variable (or counter field) may turn on its PCR component and follow a traffic indication map (TIM) broadcast procedure to attempt to receive the PCR beacon information subject to its PCR delay constraints.

In one example, the non-AP STA may turn off its PCR component immediately after it has successfully received PCR beacon information from its associated AP. In this example, the AP may consider the PCR components of the non-AP STAs, with whom it has completed a successful WUR mode negotiation, to be in doze mode from the time of the transmission of the broadcast WUR packet containing the updated counter field in its TD control field (Tb) until the time that the PCR transmission delay (PCR_delay) indicated by the non-AP STA has expired. The PCR components of the non-AP STAs, with whom it has completed a successful WUR mode negotiation, may be in awake mode from the time (Tb+PCR_delay) until after the first PCR beacon has been transmitted. To ensure correct reception of beacons, the AP may consider these PCRs of non-STAs to be in the awake mode a pre-defined number of beacon intervals after Tb+PCR_delay. The AP may consider the PCR components of the non-AP STAs, with whom it has completed a successful WUR mode negotiation, to be in the doze state after that.

In another example, a non-AP STA that receives the counter subfield of the TD control field in a WUR wake-up frame that contains a value that is different from its counter variable or counter field may turn on its PCR component and follow TIM Broadcast procedure to attempt to receive the PCR beacon information subject to its PCR delay constraints. The non-AP STA may conduct a frame exchange using its PCR component with its AP to notify the AP that its PCR component is in the awake state after it has successfully received a PCR beacon from the AP. The non-AP STA may go into WUR mode or WUR suspend mode after it has completed a successful WUR action frame exchange and has received a PCR beacon from its AP.

A non-AP STA that receives a broadcast WUP from an AP, or a broadcast WUP from its AP, or a multicast WUP that is addressed to it (e.g., by including a GID with which the STA is associated), may turn on its PCR component. A non-AP STA that receives a broadcast WUP from its AP indicating that the STA should receive a group-addressed data packet(s) using its PCR, or a multicast WUP that is addressed to it indicating that the STA should receive a group-addressed data packet(s) using its PCR, (e.g., by including a ID of "0" in the WUP), may turn on its PCR component to receive group-addressed data packets using its PCR.

In one example, the non-AP STA may turn off its PCR component immediately after it has successfully received the group-addressed data frame(s) from its associated AP using its PCR. In this example, the AP may consider the PCR components of the non-AP STAs, with whom it has completed a successful WUR mode negotiation, to be in doze mode from the time of the transmission of the broadcast WUR packet containing the updated counter field in its TD Control field (Tb) until the time that the PCR transmission delay (PCR_delay) indicated by the non-AP STA has expired. The PCR components of the non-AP STAs, with whom it has completed a successful WUR mode negotiation, may be in awake mode from the time (Tb+PCR_delay) until after the first PCR beacon has been transmitted. To ensure correct reception of beacons, the AP may consider these PCRs of non-STAs to be in the awake mode a pre-defined number of beacon intervals after Tb+PCR_delay. The AP may consider the PCR components of the non-AP STAs, with whom it has completed a successful WUR mode negotiation, to be in the doze state after that.

In another example, A non-AP STA that receives a broadcast WUP from its AP indicating that the STA should receive a group-addressed data packet using its PCR, or a multicast WUP that is addressed to it indicating that the STA should receive a group-addressed data packet using its PCR, (e.g., by including a ID of "0"), may turn on its PCR component to receive group-addressed data packets using its PCR. The non-AP STA may conduct a frame exchange using its PCR component with its AP to notify the AP that its PCR component is in the awake state after it has successfully received a PCR beacon from the AP. The non-AP STA may go into WUR mode or WUR suspend mode after it has completed a successful WUR action frame exchange and has received the group-addressed frame(s) from its AP.

In one embodiment for rediscovery of a lost WUR AP, a neighboring AP may be used as a recovery AP. A WUR AP may indicate one or more neighbor APs as backup APs for its WUR STAs. Such an indication may be in any existing field, such as the reduced neighbor report, or in a newly defined element, such as a WUR operation element. For example, one or more bits in the reduced neighbor report element or any other fields or subfield may be used to indicate that the neighbor AP supports WUR services, and/or is a backup AP for the current AP. Security information, a particular GID for WUR reset, BSSID/SSID or other ID for the replacement AP, and/or pass phrases may be included in any PCR frames (e.g., WUR action frames or WUR response frames) which may be part of a WUR negotiation.

When a WUR AP is lost, for example, due to theft or damage, the replacement AP may be used to wake up existing WUR STAs in WUR mode. The replacement AP may send wake-up packets to the WUR devices associated with the lost AP, using security information, its ID, or GID, to wake up the WUR devices, and/or to reset the WUR devices.

The WUR STA may wake up after receiving a WUR packet based on one or more condition. One such condition may be that the WUP is from a replacement AP for the WUR AP to which it is associated. Another condition may be that the WUP may be targeted to a GID/Broadcast ID to which the WUR STA belongs, or the GID is associated with the loss of an existing AP. Another condition may be that the ID, such as BSSID, SSID or other type of ID, of the WUR AP may be included in the WUP.

The WUR STA may wake up and may disassociate from its previous AP after a time out after waking up.

The replacement AP may indicate in one or more of its PCR frames that it is the replacement AP for the lost AP, and/or the ID of one or more replacement APs.

The WUR STA may choose to (re)associate with the replacement AP or (re)associate with one of the replacement APs.

In one embodiment for rediscovery of a lost WUR AP where the lost WUR AP was a member of an 802.11 extended service set (ESS), the AP may not exist independently because it is a member of the ESS. The AP in an ESS may be a component of an extended form of network that is built with multiple BSSs (APs). The architectural component used to interconnect the BSSs (APs) is the distribution system (DS). This added architectural component, the DS, may allow for multiple types of recovery when an AP (BSS) is unexpectedly lost. This may be enabled by the AP notifying the DS of the WUR STA association, configuration, security and any other information. This notification may be part of the WUR STA association process. The DS and/or the distribution system service (DSS) or a controller attached to the DS may then keep track of the WUR STA configuration values, security information, and expected behaviors. The DS or the attached controller may be aware of the loss of the AP (BSS) and then based on the DS's knowledge of the ESS, send the information it has on the WUR STAs that were associated with the unexpectedly lost AP to one or more of the remaining APs in the ESS to provide replacement functionality for the lost AP. This may enable WUR functionality recovery without notification of the WUR STA or the need of the WUR STA to re-establish WUR services or schedules. This may be a transparent recovery of the WUR functionality for the WUR STAs. The new WUR AP or APs may provide the WUR STA with the new AP's MAC address and configuration information in the wake-up message, or upon wake up the WUR STA may choose a different BSS in the ESS to associate with, just as a STA associated in a ESS chooses its associated BSS.

A similar type of transparent recovery may be also possible for a general link (GLK) AP that has a WUR controller as part of its GLK network. Such a GLK AP may provide WUR services to both WUR GLK STAs and WUR non-GLK STAs. The associated WUR controller may have knowledge of the WUR STAs association parameters just as the DS would, and may provide WUR services to each of the WUR STAs that were associated with the unexpectedly lost AP by using other GLK APs which it has knowledge of to provide the WUR functionality.

In addition to transparent recovery, the DS and/or the WUR controller may wake up the WUR STAs that were associated with the unexpectedly lost AP and require them to associate with a currently active ESS AP or GLK AP, to re-establish WUR services and scheduling. In a partial transparent recovery associated WUR STAs may have some of its WUR functionality provided in a transparent manner and some of its WUR functionality provided only after re-association.

WUR STA association with an AP that is part of an ESS may require the AP to forward all WUR STA association information to the DS. WUR STA association with a GLK AP which is part of a network containing a WUR controller may require the GLK AP to forward all WUR STA association information to the WUR controller or another entity.

As part of this recovery process there may be control signaling in the WUR transmission sent to the WUR STA. This signaling may include frequency band information, the MAC address of the new AP, the MAC address of several potential new APs, neighbor report information, AP beacon timing information, WUR beacon timing information, ESS information, BSS information, or any other information that may enable the WUR STA to continue to be associated with the ESS or a different BSS and/or receive WUR services. Part of the signaling may be sent in the WUR transmission and a portion of the signaling may be sent using 802.11, or the WUR transmission may indicate that signaling must be performed on the 802.11 radio to configure/reconfigure the WUR STA association or re-association. The WUR transmission sent to the WUR STA may also request the WUR STA make measurements or provide information about specific or available APs seen by the STA.

In one embodiment for rediscovery of a lost WUR AP, the WUR AP may be "lost" because it is being replaced or upgraded by a new WUR AP and therefore the loss may be expected and planned for. A particular BSS counter value may be used to indicate that a WUR AP is terminating its service (i.e., being lost). Such a BSS counter value may be all "0"s or all "1" or a pre-defined value. Such a value may not be used to indicate regular BSS setting changes. Such a value may also be included in a PCR frame, such as management frame, action frame, WUR action frame or as a WUR response frame. In addition, a WUR action frame, such as a WUR response frame may include the value of "current WUR BSS counter value" so that the WUR STA is aware of the current setting of the WUR BSS counter value used in the WUR beacons at the time that it is entering the WUR mode. The current BSS counter value may be derived from or based on another counter, such as AP-CSN, or other Beacon counters used in the BSS.

Before the existing WUR AP is replaced, it may set the value of the BSS counter to the value that indicates "terminating service". In another example, the WUR AP may set the value of the BSS counter randomly; in order to guarantee that all STAs will be woken up for new BSS settings, the WUR AP may increase the BSS counter without requiring that the BSS setting has changed.

A WUR AP may set the BSS counter using the BSS counter value in the WUR beacons to wake up all WUR STAs that are currently in WUR mode. Additionally or alternatively, a new Wake up frame may be defined for service termination. The new wake-up frame may indicate the BSS counter values. The WUR beacons and/or WUR termination wake up frames may be embedded with the BSSID of the AP. Such WUR beacon or WUR frames may be sent or repeated over all available WUR channels, WUR bands, and for a period that may be sufficient to wake up all WUR STAs that are currently in WUR mode.

The AP may indicate in one or more PCR (primary connectivity radio) frames (e.g., management frames or action frames), such as beacons, short beacons, and/or broadcast WUR action frames, that it is terminating service. The WUR AP may include the WUR BSS counter in the PCR frames. The WUR AP may include the replacement AP, for example, in a reduced neighbor report element. In one instance, one or more bits may be used in the reduced neighbor report to indicate that it supports WUR operations.

When a WUR STA in WUR mode receives a WUP, such as during an on duration of its WUR duty cycle, it may wake up based on one or more conditions. One such condition may be that the WUR beacon contains a different value for the BSS counter than the one contained in the last WUR beacon that it has received, or a different value than the one indicated in the WUR negotiation process, or a different value derived from existing counters when it entered the WUR mode, a value that indicates "AP terminating service". Another condition may be that the wake-up frame indicates that the AP is terminating service, indicated by its type and/or GID, address, or other indicators. Another condition may be that the security information included is verified. Another condition may be that the embedded BSSID/SSID is the desired BSSID/SSID.

The WUR STA may wake up, and may send an UL packet to the AP on their PCRs according to WUR procedures. The WUR AP may then send a disassociation frame. In one example, the WUR AP may send a broadcast dissociation frame to all STAs, for example, by invoking a disassociate.request primitive using a broadcast MAC address and a reason code for "STA reset" or "BSS reset". In another example, when a WUR STA is woken up for the reason of "BSS termination" or "AP service termination", which may be indicated by a particular BSS counter value or by the type of wake up frame, it may wake up and send a disassociation frame to the WUR AP. In yet another example, the WUR STA may disassociate from the AP after a time out after waking up.

The WUR STA may choose to (re)associate with the replacement AP, and then conduct WUR negotiations to establish WUR parameters and then the WUR STA may request to enter WUR mode and may turn off its PCR.

In one embodiment for rediscovery of a lost WUR AP, the loss of the AP may be expected and may be in an ESS or GLK network. In such an embodiment, the AP would not exist independently since it is a member of the ESS. The AP in an ESS is a component of an extended form of network that is built with multiple BSSs (APs). The architectural component used to interconnect the BSSs (APs) is the distribution system (DS). This added architectural component, the DS, may allow for multiple types of recovery when an AP (BSS) is expected to be lost. This may be enabled by the AP notifying the DS of the WUR STA association, configuration, security, and/or any other information. This notification can be part of the WUR STA association process. The DS and/or the DSS, and/or a controller attached to the DS may then keep track of the WUR STA configuration values, security information, and the expected behaviors. The DS or the attached controller, based on its knowledge of the ESS configuration and the AP that is expected to be lost, may decide how to transparently replace the AP that is expected to be lost or reconfigure the WUR STAs associated with the AP expected to be lost. This process may be done in a manner that is transparent to the WUR STAs or it may be done by waking the WUR STAs and having them re-associate with a chosen AP, or allowing the WUR STA choose a new AP in the ESS to re-associate with. It may also be possible for the DS and/or the DSS and/or a controller attached to the DS to wake the WUR STA and require it to associate with a new AP that may or may not be in the ESS.

A similar type of recovery may also be performed for a GLK AP that has a WUR controller as part of its GLK network. Such a GLK AP may provide WUR services to both WUR GLK STAs and WUR non-GLK STAs. The associated WUR controller would have knowledge of the WUR STAs association parameters just as the DS and/or DSS and/or a controller attached to the DS would. The associated WUR controller may provide WUR services to each the WUR STA associated with the AP to be lost by using other GLK APs that it has knowledge of to provide the WUR functionality.

In addition to transparent recovery, the DS and/or the WUR controller may also have the WUR STAs that were associated with the AP to be lost woken up and have them associate with another active ESS AP or GLK AP, to re-establish WUR services and scheduling. There may also be a partial transparent recovery where the associated WUR STAs has some of its WUR functionality provided in a transparent manner and some only after re-association.

WUR STA association with an AP that is part of an ESS may require the AP to forward all WUR STA association information to the DS. WUR STA association with a GLK AP which is part of a network containing a WUR controller may require the GLK AP to forward all WUR STA association information to the WUR controller or another entity.

As part of this process there may be control signaling in the WUR transmission sent to the WUR STA. This signaling may contain frequency band information, the MAC address of the new AP, the MAC address of several potential new APs, neighbor report information, AP beacon timing information, WUR beacon timing information, ESS information, BSS information, and/or any other information that enables the WUR STA to continue to be associated with the ESS or a different BSS and/or receive WUR services. A portion of the signaling may be sent in the WUR transmission and a portion of the signaling may be sent using 802.11, or the WUR transmission may indicate that signaling should be performed using the 802.11 radio to configure/reconfigure the WUR STA association or re-association. The WUR transmission sent to the WUR STA may also request the WUR STA make measurement or provide information about specific or available APs seen by the STA.

Multiple WUR STAs (or multiple WUR WTRUs) may be divided in to WUR wake-up groups with a WUR group ID so that they may be woken up using multi-cast wake-up packets. Multiple parameters may be associated with the multi-cast wake-up frame, such as data rates, wake-up channel/band, or the like. Due to change in channel situations, the data rates, wake-up channel/band, and the like may no longer be suitable for some members of the multi-STA WUR group. One or more embodiments may provide procedures to address how to manage the multicast WUR STA group and provide updated parameters for the WUR STA group. These procedures may be initiated by the WUR AP or by the WUR STA.

In one embodiment, a WUR AP may group one or more STAs into a WUR multicast group by assigning one or more GIDs to these STAs. Such a grouping may be based on one or more of the capabilities of the STA, such as UL MU capabilities, OFDMA capabilities, UL MU-MIMO capabilities, max wake-up delay time (or duration), min wake-up delay time, remaining duration, remaining delay, group max (or min) PCR transition time, and/or one or more group delay. The grouping may also be based on the distance from the STAs to the AP. A group of STAs that are located closer to the AP may be woken up using WUR packets of a higher data rate. A group of STAs that are located farther from the AP may be woken using WUR packets of a lower data rate. The WUP data rates, channels/bands, duty cycle, may be indicated to the STA by the WUR AP as a part of the WUR negotiation process (e.g., in the WUR response frames).

If an AP determines that one or more STAs in a multicast WUR group are not being woken up by using one or more multicast WUP, it may initiate the WUR multicast group management procedure(s).

The AP may send one or more lower data rate WUPs to the one or more STAs. The AP may send a multicast WUP by setting the receiver ID in the multicast WUP to the GID to which the STAs belong, or to a broadcast ID. The multicast WUP may contain multiple fields with each field indicating the information of the one or more WUR STAs to be woken up. The AP may send one or more unicast WUP to the STA. The WUP may carry an indication that the wake-up purpose is for WUR multicast group management.

The WUR STA may wake up after receiving a multicast WUP or unicast WUP including the indication for itself. After waking up, the STA may indicate to the AP that it is in the awake state.

The WUR AP may request the WUR STA to enter WUR mode suspend to maintain existing WUR parameters, while re-negotiating other WUR parameters, (e.g., WUP data rates, wake up channels, bands, etc.) The WUR AP may indicate the parameters that need to be changed in the WUR mode suspend request, action frames, or WUR action frames. The WUR AP may assign one or more new GIDs to the STA, along with new duty cycles, sleep times, or the like.

After the multicast WUR group management, and negotiation of WUR parameters, the WUR STA may request to enter WUR mode and may enter WUR mode after receiving a positive response from the WUR AP.

In one embodiment, a WUR AP may group one or more STAs into a WUR multicast group by assigning one or more GIDs to these STAs. Such a grouping may be based on one or more of the capabilities of the STA, such as UL MU capabilities, OFDMA capabilities, UL MU-MIMO capabilities, Min wake up delay time, and the like. The grouping may also be based on the distance from the STAs to the AP. A group of STAs that are located closer to the AP may be woken up using a WUR packet of the higher data rate. A group of STAs that are located farther from the AP may be woken using a WUR packet of lower data rate. The WUP data rates, channels/bands, and/or duty cycle, may be indicated to the STA by the WUR AP as a part of the WUR negotiation process (e.g., in the WUR response frames).

If the WUR STA determines that the current WUR parameters are no longer suitable for itself, it may initiate the WUR multicast group management procedure(s). Such a determination may be based on measurements of WUR beacons or based on the changing of an operation mode (e.g., UL MU enabling or disabling, enabling MU-MIMO, or requiring different duty cycles, longer/short awake times, or the like).

The WUR STA may wake up and then the STA may indicate to the AP that it is in the awake state. The WUR STA may initiate the multicast WUR group management procedure(s) by requesting to enter WUR mode suspend in order to maintain existing WUR parameters while re-negotiating other WUR parameters (e.g., WUP data rates, wake up channels, bands, etc.). The WUR STA may indicate the parameters that need to be changed in the WUR mode suspend request or WUR action frames. The WUR AP may assign one or more new GIDs to the STA along with new duty cycles, sleep times, and the like.

After the multicast WUR group management and the negotiation of WUR parameters, the WUR STA may request to enter WUR mode and may enter WUR mode after receiving a positive response from the WUR AP.

As described above, in a wireless network such as cellular or 802.11ba networks, a multi-cast wake-up frame may be used to wake up a number of STAs. Specifically, to reliably wake up multiple STAs, a number of wake-up frames may be used. However, this may make the timing of the wake-up for different STAs to be different; thereby possibly creating inefficiency since UL MU capabilities may not be utilized. For example, when STAs are woken up around similar times, there may be congestion at the medium. One or more embodiments may address procedures for efficient multi-STA wake-up and subsequent UL medium access to ensure that multiple STAs may wake reliably and transmit their uplink packets efficiently.

In one embodiment for MU capability-based WUR grouping and wake-up, an AP may group one or more STAs together for WUR operation. In one example example, the AP may group them based on STA capability such as uplink (UL) or downlink (DL). For example, STAs that support UL MU trigger-based (TB) access (UMTA) transmission may be grouped together as one group. STAs that support UMTA and/or UL OFDMA-based random access (UORA) transmission may be grouped together as another group. STAs that support triggered uplink access (TUA) transmission may be grouped together as another group. Legacy STAs that are not able to perform DL/UL multiple access may be grouped together as another group.

In one example, one or more WUR group IDs (GIDs) may be reserved for these groups of STAs. For example, the AP may assign N1 WUR GIDs for UMTA capable groups, N2 WUR GIDs for UMTA/UORA capable groups, and N3 WUR GIDs for legacy groups. In another example, the AP may reserve all the GIDs in a range for UMTA capable group, all the GIDs in a second range for UMTA/UORA capable group, and all the GIDs in a third range for a legacy group. The number of GIDs assigned for each group and/or the GID ranges may be predetermined, predefined, or configurable. In the case that the GID range may be configurable, the configuration may be announced by the AP in management frames such as a beacon frame and (re)association frames, control frames, action frames or other type of control/management/action frames.

By assigning one of these GIDs, the STAs may notice all of the users in the group may or may not have MU capability. Furthermore, when the STAs are woken up by a WUR frame with a WUR GID, the STAs may check the range of the GID and perform corresponding channel access scheme based on the group capability. As used herein, the terms WUR GID and GID may be interchangeably used throughout this disclosure.

Figure 4:
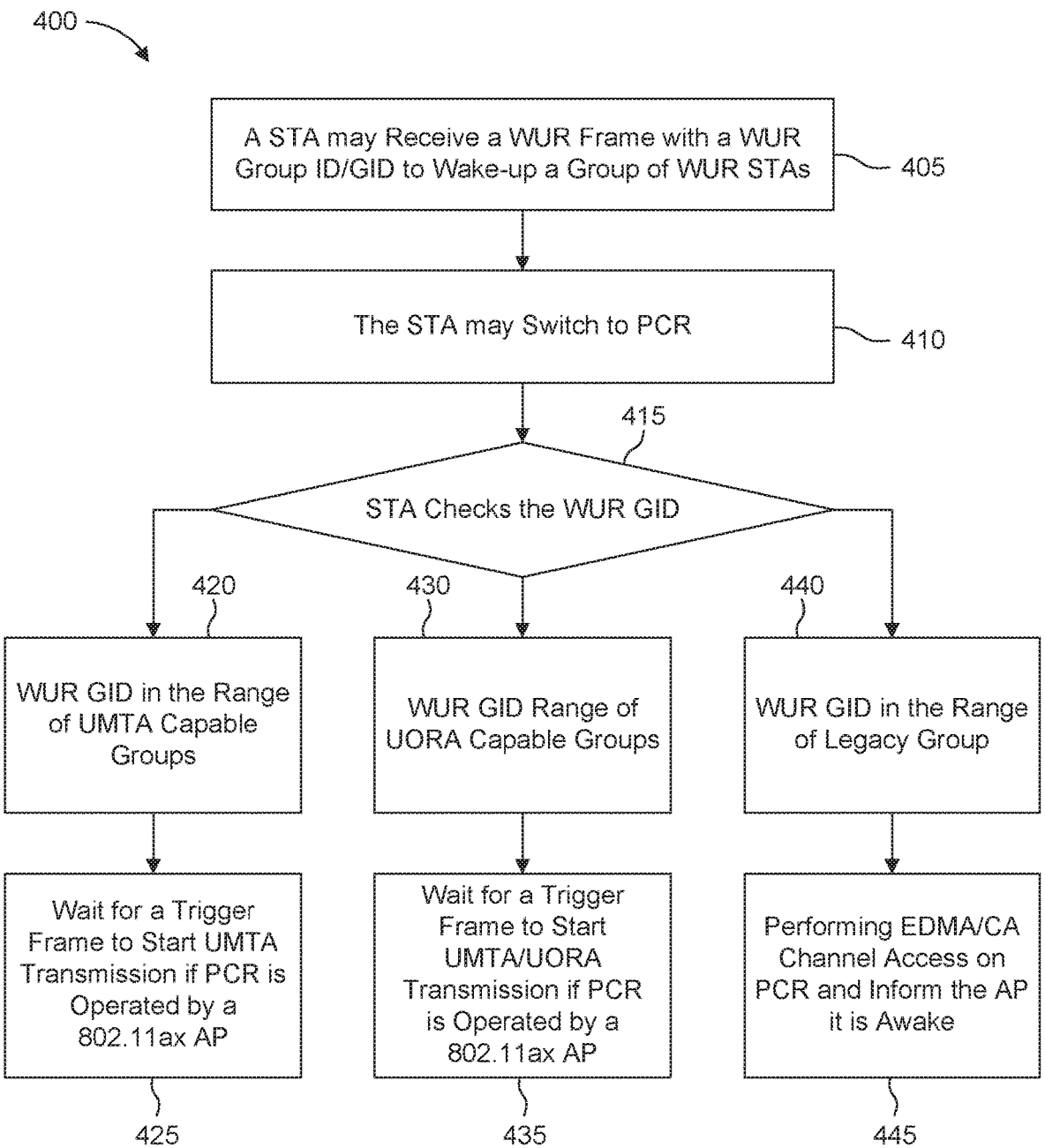
FIG. 4 is a diagram illustrating an example STA procedure with implicit multi-user capable group indication.

FIG. 4 illustrates an example STA procedure 400 with implicit MU capable group indication, which may be used in combination with any of other embodiments described herein. Before entering to WUR mode, a STA may be assigned one or more WUR GIDs by an AP during WUR negotiation/configuration procedure. While the STA is in WUR mode, the STA may receive a unicast/broadcast/multicast WUR frame with a WUR GID at step 405. This WUR frame with a WUR GID may wake up a group of WUR STAs. For example, if the GID is assigned to the STA in the group, the STA may switch to PCR at step 410. The STA may check the WUR GID at step 415.

At step 420, if the WUR GID is in the range of UMTA capable WUR groups, the STA may monitor the PCR channel and wait for a trigger frame to trigger an UL OFDMA transmission or UL MU-MIMO transmission at step 425. The Trigger frame may indicate the STAs which just switched from WUR to PCR may use the opportunity to transmit. The trigger frame may include this information to dedicated STAs. The STA may use the allocated resources to perform UL OFDMA transmission or UL MU-MIMO transmission.

At step 430, if the WUR GID is in the range of UMTA/UORA capable WUR groups, the STA may monitor the PCR channel and wait for a Trigger frame to trigger an UL OFDMA/MU-MIMO transmission at step 435. The trigger frame may indicate the STAs which just switched from WUR to PCR may use the opportunity to transmit. The trigger frame may include information to dedicated STAs and/or resource allocation for randomly accessed uplink transmissions. The STA may use dedicated allocated resources to perform UL OFDMA/MU-MIMO transmission. If the STA does not find a dedicated allocation and then the trigger frame may have an allocation for UORA transmission (e.g., by setting the AID12 value to 0), where the STA may perform UL OFDMA based on random access procedure to transmit on one or more allocated RUs. In one example, the UMTA operation may be omitted for this group.

At step 440, if the WUR GID is in the range of legacy WUR groups, the STA may monitor the PCR channel and perform EDCA/CA channel access procedure to inform the AP that the STA is awake at step 445. The trigger frame described herein may allocate resources for and solicit one or more TB PPDU transmissions. The trigger frame may also carry other information required by the responding STA to send a TB PPDU. The frame format for the trigger frame may include, but are not limited to, frame control, duration, RA, TA, common information, one or more user information, padding, or FCS field.

Figure 5:
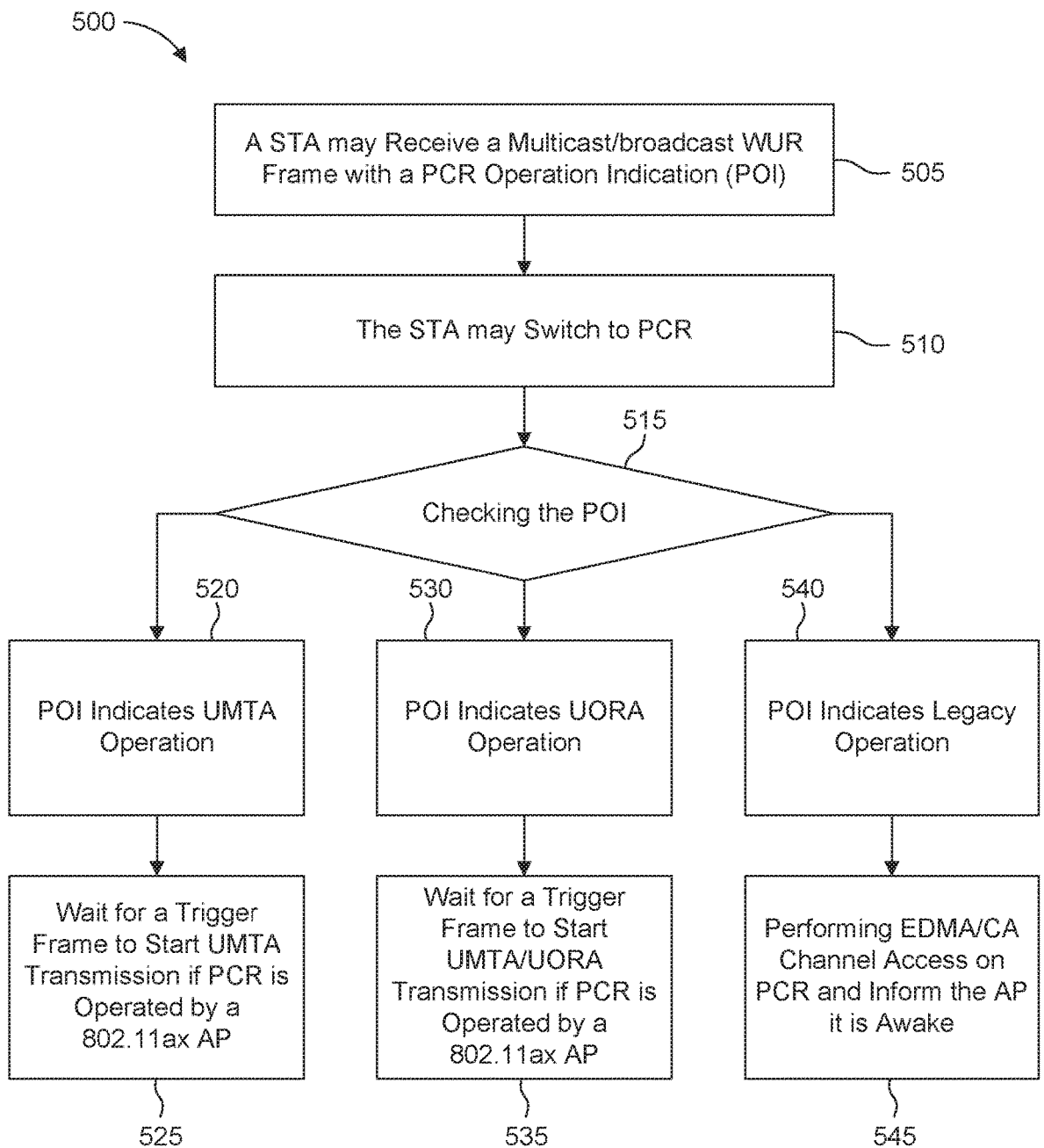
FIG. 5 is a diagram illustrating an example STA procedure with explicit PCR operation indication.

In one embodiment, the grouping procedure may be based on MU capability. In the WUR frame, a PCR operation indication (POI) field may be included. This field may indicate whether a UMTA operation or a UORA operation or legacy channel access may be expected. FIG. 5 illustrates an example STA procedure 500 with explicit POI, which may be used in combination with any of other embodiments described herein.

In the example procedure of FIG. 5, a STA may be assigned one or more WUR GIDs by an AP during WUR negotiation/configuration procedure. At step 505, the STA may receive a broadcast/multicast WUR frame with a WUR GID. If the GID may be assigned to the STA, the STA may switch to PCR at step 510. The STA may check the POI included in the WUR frame at step 515.

At step 520, if the POI indicates that a UMTA transmission may be expected, the STA may monitor the PCR channel and wait for a Trigger frame to trigger an UL OFDMA transmission or UL MU-MIMO transmission at step 526. The trigger frame may indicate that this frame may be used to trigger STAs to switch from WUR to PCR. The trigger frame may include information to dedicated STAs. The STA may use the allocated resources to perform UL OFDMA transmission or UL MU-MIMO transmission.

At step 530, if the POI indicates that a UMTA/UORA transmission may be expected, the STA may monitor the PCR channel and wait for a trigger frame to trigger an UL OFDMA/MU-MIMO transmission at step 535. The trigger frame may indicate that this frame may be used to trigger STAs to switch from WUR to PCR. The trigger frame may include information to dedicated STAs and/or resource allocation for randomly accessed uplink transmissions. The STA may use the dedicated allocated resources to perform UL OFDMA/MU-MIMO transmission.

If the STA does not find a dedicated allocation and then the trigger frame may have an allocation for UORA transmission (e.g., by setting the AID12 value to 0), where the STA may perform UL OFDMA based random access procedure to transmit on one or more allocated RUs.

At step 540, if the POI indicates that legacy transmission is expected, the STA may monitor the PCR channel and perform EDCA/CA channel access procedure to inform the AP the STA is awake at step 545.

As discussed herein, there may be a UMTA capable group and UORA capable group. In an alternative or additional example, the two groups may be merged to MU capable groups. For example, STAs woken up with a MU capable group may need to monitor the PCR and wait for the trigger frame.

It is noted, as discussed herein, that there may be MU capable groups (including UMTA and UORA), and they may need to wait for a trigger frame to perform MU UL access. In another example, the MU capable STAs (including UMTA and UORA) may be allowed to monitor the medium for a fixed duration for the trigger frame. On expiration of the duration and no trigger frame is to be received, the STA may be allowed to perform traditional EDCA/CA channel access. The fixed duration may be referred to as Maximum_Trigger_Waiting_Duration for MU capable STAs. The fixed duration may be predefined or predetermined or configurable. In the case that the duration may be configurable, the configuration may be in a beacon frame, (re)association frames, or other type of control/management/action frames.

Figure 6:
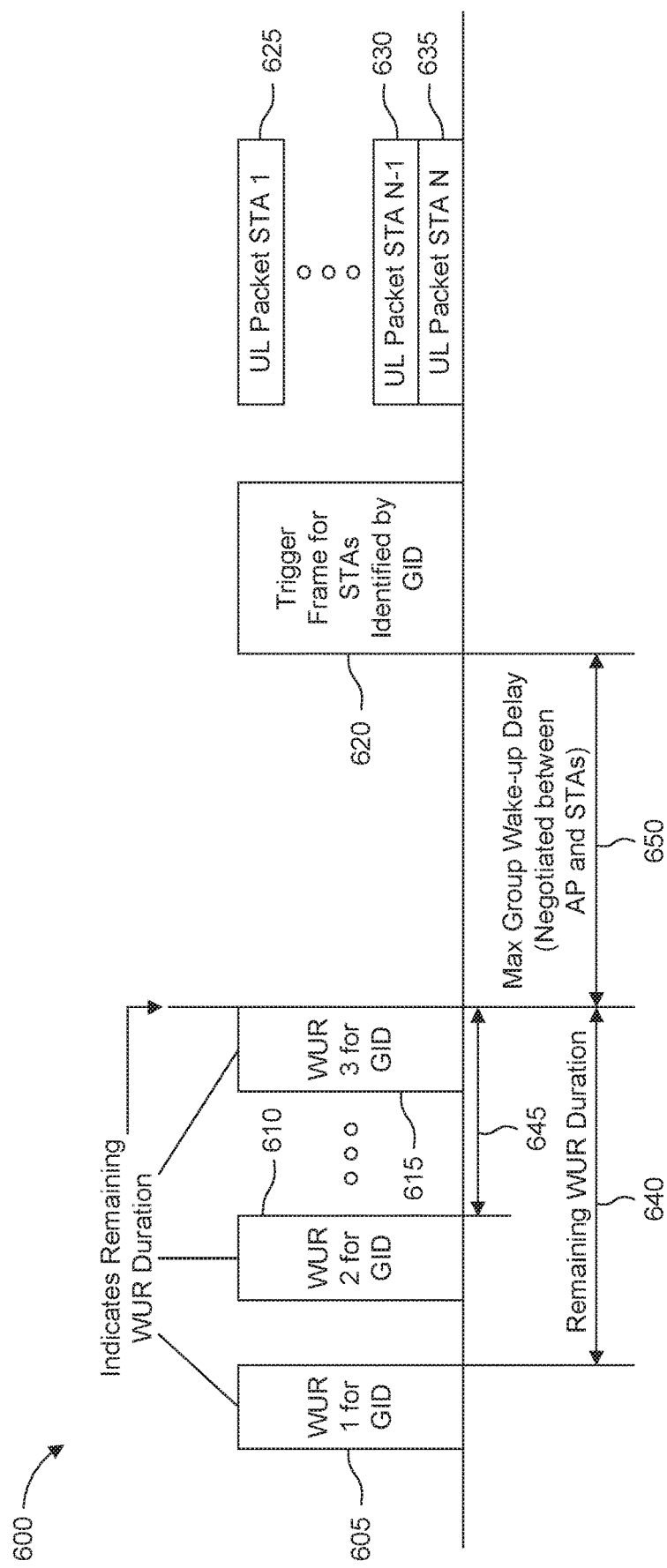
FIG. 6 is a diagram illustrating an example procedure for multi-STA wake-up and uplink (UL) multi-user (MU) medium access based on one or more group delay.

FIG. 6 illustrates an example procedure 600 for multi-STA wake-up and uplink (UL) multi-user (MU) medium access based on one or more group delay, which may be used in combination with any of other embodiments described herein. As described above, multiple STAs may be grouped together and assigned a group ID (e.g., WUR GID) by an AP based on STAs' capabilities. After the WUR negotiation/configuration procedures are completed, a group of STAs may enter into WUR modes based on their respective negotiated parameters. While the group of STAs is in WUR modes, each STA in the group may receive one or more unicast/broadcast/multicast WUR frames 605, 610, 615 that include a WUR GID that matches the STA's GID. For example, a first STA in the group may receive a WUR frame 1 605 and a second STA in the group may receive a WUR frame 2 610. An Nth STA in the group may receive WUR frame 3 615 to wake up. The WUR frames 605, 610, 615 may be the same and may be transmitted repeatedly to the group of STAs to ensure the reliability of wake-up.

The WUR frames 605, 610, 615 may include remaining WUR duration 640, 645 (or remaining WUR delay) indicated by the AP for each STA in the group. For example, the WUR frame 1 605 that is transmitted to the first STA in the group may include 10 ms as the remaining WUR duration 640 and the WUR frame 2 610 that is transmitted to the second STA in the group may include 5 ms as the remaining WUR duration 645. The WUR frame 3 615 that is transmitted to the Nth STA in the group may include 0 ms as the remaining WUR duration. Once the STAs in the group received the WUR frames 605, 610, 615 that include the remaining WUR duration 640, 645, the STAs may not wake up from the WUR mode until the remaining duration 640, 645 is expired. For example, the first STA in the group may wait 10 ms until the first STAs turns on its PCR component. The second STA in the group may wait 5 ms until the second STA in the group turns on its PCR component. The Nth STA in the group may not need to wait because the received remaining WUR duration indicates 0 ms (i.e. no delay). By aligning the wake-up timing for each STA or turning on the PCR components of STAs in the group approximately at the same time), the STAs, especially the first and second STAs in the groups, may save energy because the first and second STAs do not need to wake up (or turn on PCRs) until the nth STA in the group is ready to wake up (or turn on PCRs). As used herein, the terms remaining WUR duration, remaining WUR delay, remaining duration, remaining delay or any combination thereof may be used interchangeably throughout this disclosure.

Once the STAs in the group turn on their PCR components, the STAs may start a timer to ensure the receipt of a trigger frame. For example, the STAs may run the timer until maximum group wake-up delay 650 (or maximum group wake-up duration) is expired unless the STAs receive a trigger frame 620. For example, if a STA receive a trigger frame 620 when the timer is not expired (i.e. the timer is less than or equal to the maximum group wake-up delay 650), the STA may transmit UL packets such as UL packet STA1 625, UL packet STA N−1 630, and UL packet STA N 635 as illustrated in FIG. 6. The maximum group wake-up delay 650 may be received from the AP during the negotiation/configuration procedure. As used herein, the terms maximum group wake-up delay, maximum group wake-up duration, maximum trigger waiting delay, maximum trigger waiting duration, group wake-up delay, group wake-up duration or any combination thereof may be used interchangeably throughout this disclosure.

It should be noted that the remaining WUR duration 640, 645 and the maximum group wake-up delay 650 may form a single duration or delay to wake up the STAs and receive the trigger frame. The single duration or delay may be determined by the AP during the negotiation/configuration procedures or determined by the STAs before or during WUR mode. For example, a STA may receive a WUR frame or a PCR frame that includes one or more group delay determined by the STA or the AP and run the one or more group delay to wake up and receive the trigger frame to initiate UL MU medium access. The one or more delay may be interchangeably referred to as a remaining delay, remaining duration, group max (or min) wake-up delay, group max (or min) wake-up duration or the like.

Trigger frames may be used to trigger MU access for STAs that switch from WUR to PCR. In some scenarios in WUR, the unicast/broadcast/multicast wake-up frame may not be able to wake up all the STAs in the group, multiple wake-up frames may be transmitted. Correspondingly in PCR, multiple trigger frames may be needed to trigger a subset of STAs which has been woken in the group. A field in the trigger frame may indicate that the trigger frame may be used to trigger STAs that just entered PCR from WUR. For example, a trigger type field may be used to indicate a WUR trigger. This trigger frame may be referred to as a WUR trigger frame. A STA may perform TB transmission in responding to a WUR Trigger. If the STA may receive an acknowledgement for the TB transmission, the STA may not respond to a WUR trigger frame transmitted later.

Figure 7:
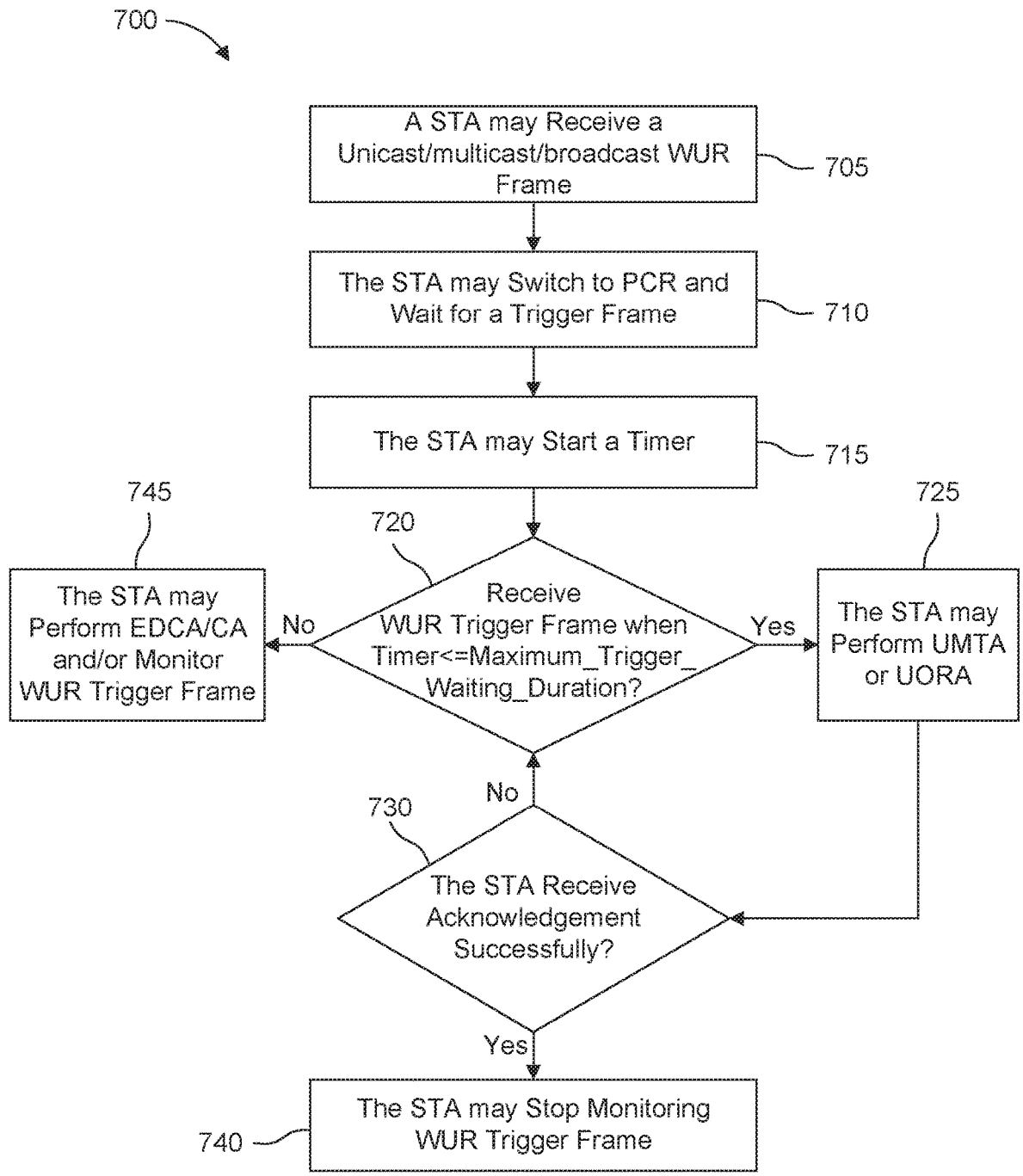
FIG. 7 is a diagram illustrating an example STA procedure with WUR trigger frame.

FIG. 7 illustrates an example STA procedure 700 with WUR trigger frame, which may be used in combination with any of other embodiments described herein. At step 705, a STA may receive a unicast/multicast/broadcast WUR frame over WUR. The STA may be the intended receiver of the WUR frame. The WUR frame may indicate explicitly or implicitly that the STA may expect to receive a WUR trigger frame in PCR. At step 710, the STA may switch to PCR and wait for a trigger frame. At step 715, the STA may start a timer or continue using a timer.

At step 720, if the STA receives a WUR trigger frame when the timer is less than or equal to Maximum_Trigger_Waiting_Duration, the STA may perform UMTA or UORA transmission at step 725.

At step 730, if the STA receives acknowledgement successfully, the STA may stop monitoring the WUR trigger frame at step 740. More specifically, the STA may not be triggered to perform UORA later. The STA may also stop the timer.

At step 730, if the STA does not receive the acknowledgement successfully, the STA may further wait until the STA receives the WUR trigger frame at step 740 on a condition that the timer is less than or equal to the Maximum_Trigger_Wating_Duration. If the timer is expired (or the timer is greater than the Maximum_Trigger_Wating_Duration), the STA may perform regular PCR operation (e.g., EDCA/CA at step 745). Alternatively or additionally, if the STA does not receive the acknowledgement successfully, the STA may continue the timer and monitor the WUR Trigger frame (i.e. go back to steps 715 and/or 720).

At step 720, if the STA does not receive a WUR Trigger frame when the timer is less than or equal to the Maximum_Trigger_Waiting_Duration or within the Maximum_Trigger_Waiting_Duration, the STA may be allowed to perform EDMA/CA channel access at step 745. Meanwhile, the STA may be triggered by a WUR trigger frame transmitted later. The STA may stop the timer.

In another example, if multiple wake-up frames are used to wake up one or more WUR STAs, the wake-up frames may include a remaining number of wake-up frames, a number of remaining wake-up frames, and/or a remaining time for transmitting wake-up frames for the same group of STAs. A number of wake-up frames may be used to ensure that all STAs within a group may be woken up. The remaining number or time for transmitting wake up frames for the same group of STAs may be in the unit of the current wake-up frame, or in the unit of the high data rate wake-up frames. Such a sequence of wake-up frames may use the same or different rates. Such a sequence of wake-up frames may be transmitted consecutively with one legacy 20-MHz band header, and WUR mark up. The wake-up frames may also be transmitted over different channels. Additionally, the group max or min wake-up delay may be defined for a group and associated with a GID, and may be indicated to the WUR STA in the WUR negotiation process (e.g., in the WUR response frame). Such a determination of group maximum or minimum wake-up delay may be done on the basis of minimum wake-up delay information provided by the WUR STA to the AP in the capability exchange. The target time to transmit the trigger frame for a group of STAs on the PCR may be expected around or at the end of the interval used to transmit the remaining WUPs plus the max or min wake-up delay of the group.

In another example, a WUR AP may send out a multicast WUP containing only the GID initially to every member of the group of STAs that are associated with that GID. The GID, address field, and/or any other field in the multicast WUP may indicate that it is an initial or "whole set" multicast WUP transmission. All WUR STAs that have received an initial or "whole set" multicast WUP addressing to a GID that it is associated with may wake up and alert the AP that it is in the awake state. If a WUR AP wants to address only a subset of STAs in a multicast WUP, such as in a retransmission of a multicast WUP, or if the WUR AP only wants to wake up a subset of STAs in a multicast WUR STA group, it may send a multicast WUP that may be addressed to the broadcast address and include a list of individual STA IDs (e.g., WIDs) that the AP wants to wake up. In another example, the WUR AP may send a multicast WUP that is addressed to the GID of the group of STAs and include a list of individual STA IDs (e.g., as WIDs) that the AP wants to wake up. The WUP may carry an indication in the address field, or any other field, that the multicast WUP is a retransmission and/or it is meant to wake up a subset of STAs associated with the GID or broadcast address. When a WUR STA receives a WUP that is addressed to the broadcast address or a GID that it is associated with, and it detects an indication of "subset wake-up" or "multicast WUP retransmission", it may then further decode the WUP to see whether its individual ID (e.g., WID) is included in the multicast WUP. If its ID is included, then the WUR STA may wake up and alert the AP that it is in the awake state. Otherwise, the WUR STA may not wake up.

In one example, a group max wake-up delay or group max PCR transition time may be defined for a group associated with a group ID. This group max PCR transition time may be included in the WUR parameters field from the WUR AP, which may be part of the WUR mode element, or any other element, that may be contained in a WUR action frame, such as the WUR mode setup frame that is sent from the AP to the non-AP STA.

Figure 8:
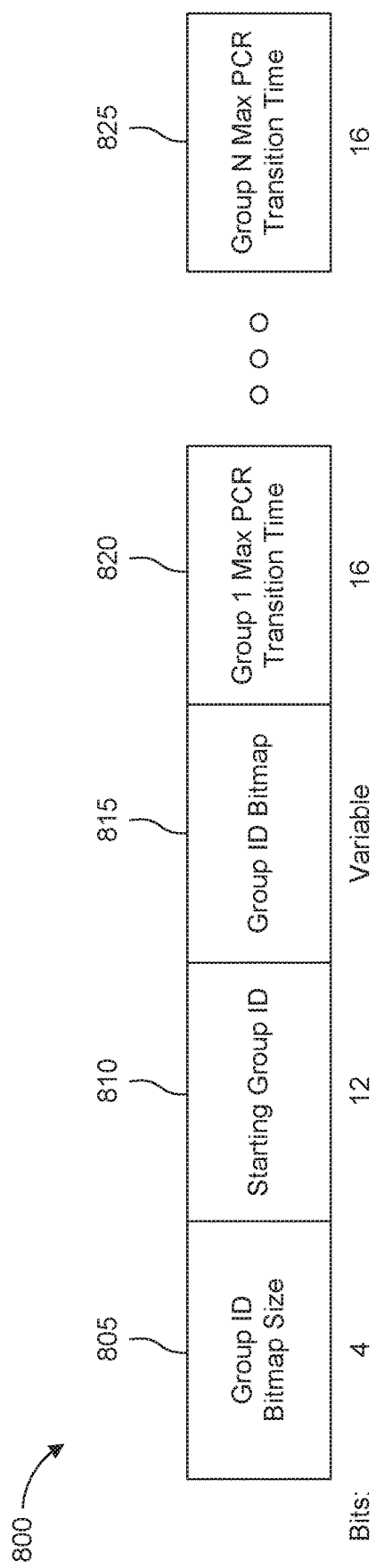
FIG. 8 is a diagram illustrating an example group ID List subfield of a WUR mode element.

FIG. 8 illustrates an example group ID list subfield 800 in the WUR mode element, which may be used in combination with any of other embodiments described herein. As illustrated in FIG. 8, the group ID list subfield 800 may include, but are not limited to, group ID bitmap size 805, starting group ID 810, group ID bitmap 815, group 1 max PCR transition time 820, and group N max PCR transition time 825. If membership for N group ID(s) is indicated for a particular STA in the group ID bitmap subfield 815, then N subfields of group max PCR transition time 820, 825 may be included in the same group ID list subfield 800, or in the same element, such as the WUR mode element, which may be included in the WUR action frames such as WUR mode setup frame with a response status set to accept in the same WUR action frame. The group max PCR transition time 820, 825 for a group identified by a group ID, or GID, may be determined by the AP using all the PCR transition time provided by all the non-AP STAs in the same group.

Figure 9:
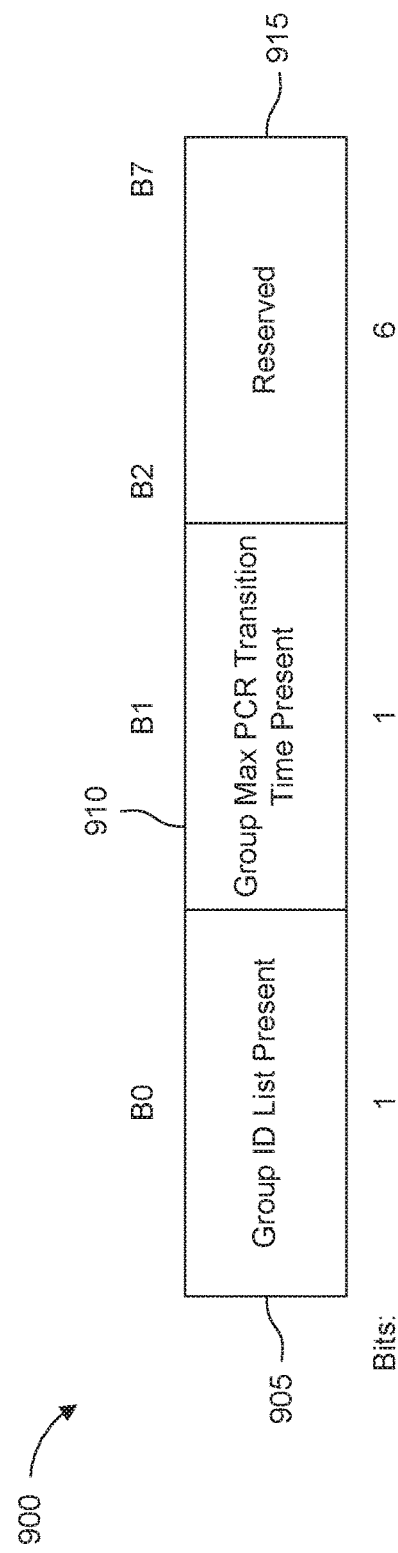
FIG. 9 is a diagram illustrating an example frame format of the WUR Parameters Control field to indicate the presence of group max PCR transition time.

FIG. 9 illustrates an example frame format 900 of the WUR parameters control field to indicate the presence of group max PCR transition time 910, which may be used in combination with any of other embodiments described herein. As illustrated in FIG. 9, a WUR parameters control field in a WUR mode element may include group ID list present 905, group max PCR transition time present 910, and reserved subfield 915. The group max PCR transition time may be provided by the AP to a non-AP STA. For example, the AP may include an indication whether group max PCR transition time is included using the WUR parameters control field in the WUR mode element.

The group max PCR transition time present subfield 910 may be set to 1 if the group max PCR transition time subfield is present in the following WUR parameters field. Otherwise, it may be set to 0. In one example, two or more bits may be used to indicate one or more formats for the group max PCR transition time subfield. For example, the value "0" may indicate that no group max PCR transition time is present. The value "1" may indicate that the group max PCR transition time subfield of format 1 is included in the following WUR parameter field. The value "n" may indicate that the group max PCR transition time subfield of format n is included in the following WUR parameter field.

Figure 10:
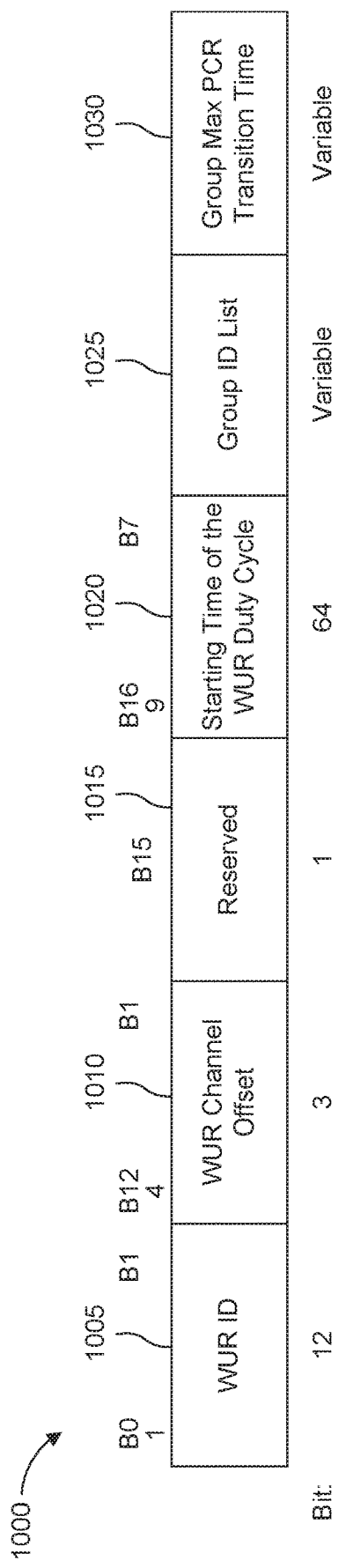
FIG. 10 is a diagram illustrating an example WUR parameter field in a WUR mode element.

FIG. 10 illustrates an example WUR parameter field 1000 in a WUR mode element, which may be used in combination with any of other embodiments described herein. As illustrated in FIG. 10, the WUR parameter field format from a WUR AP may include, but are not limited to, WUR ID 1005, WUR channel offset 1010, reserved subfield 1015, starting time of the WUR duty cycle 1020, group ID list 1025, and group max PCR transition time subfield 1030. The group max PCR transition time subfield 1030 may be included in the WUR parameter field directly or as a subfield of the group ID list subfield.

The group max PCR transition time subfield 1030 may indicate the group max PCR transition time for one or more of group IDs assigned to the STA. The group max PCR transition time subfield 1030 may be present is the group max PCR transition time present subfield 1010 of the WUR parameters control field is set to 1.

Figure 11:
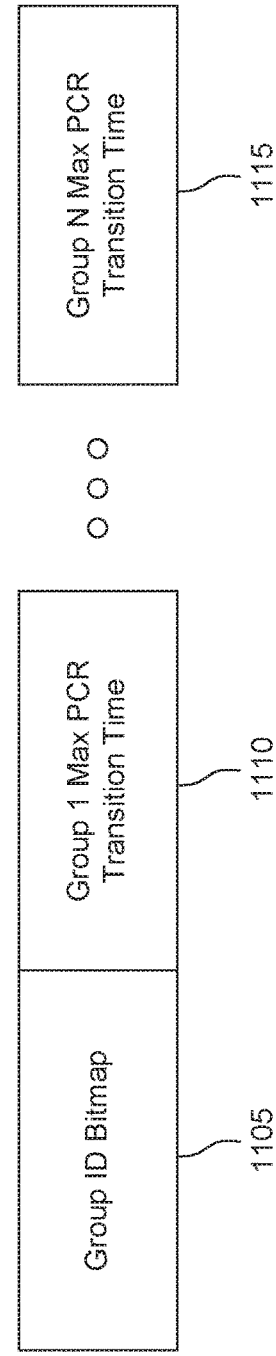
FIG. 11 is a diagram illustrating an example group max PCR transition time subfiled of format 1.

FIG. 11 illustrates an example group max PCR transition time subfield of format 1 1100, which may be used in combination with any of other embodiments described herein. As illustrated in FIG. 11, the group max PCR transition time subfield of format 1 1100 may include group ID bitmap 1105, group 1 max PCR transition time 1110, and group N max PCR transition time. The group ID bitmap 1105 may be of the same size as the group ID bitmap in the group ID list. A bit "1" may indicate that a group max PCR transition time subfield 1110, 1115 is present following the group ID bitmap. The order of the group MAX PCR transition time 1110, 1115 for each group may follow the order of the bit "1"s in the group ID bitmap subfield 1105.

In another example, the group ID bitmap 1105 may be named as the group delay bitmap. The group delay bitmap may have the same size as the group ID bitmap in the group ID list subfield and may indicate whether a maximum group PCR transition delay is provided for a group ID in the max group delays list field. Bit position 'n' in the group delay bitmap may correspond to a bit position 'n' in the group ID bitmap in the group ID list subfield, and hence to group ID equal to (SGID+n). A bit in the group delay bitmap may not be set to 1 if the corresponding bit in the group ID bitmap in the group ID List subfield is set to 0. A bit in the group delay bitmap may be set to 1 to indicate that the max group PCR transition delay is provided for the corresponding group ID in the max group delays list field. The total number of bits set to 1 in the group delay bitmap field may indicate the number of max group PCR transition delay field contained in the max group delay list subfield.

The max group delays list subfield may include one or more max group PCR transition fields. The max group PCR transition field may have multiple bits (e.g., 8 bits).

The nth max group PCR transition delay field may correspond to the nth bit set to 1 in the group delay bitmap subfield and indicate the maximum PCR transition delay among all STAs within the group associated with the group ID corresponding to the nth bit set to 1 in the group delay bitmap subfield. The encoding of the max group PCR transition field may follow the encoding of the PCR transition delay subfield, as described in WUR capabilities element above.

Figure 12:
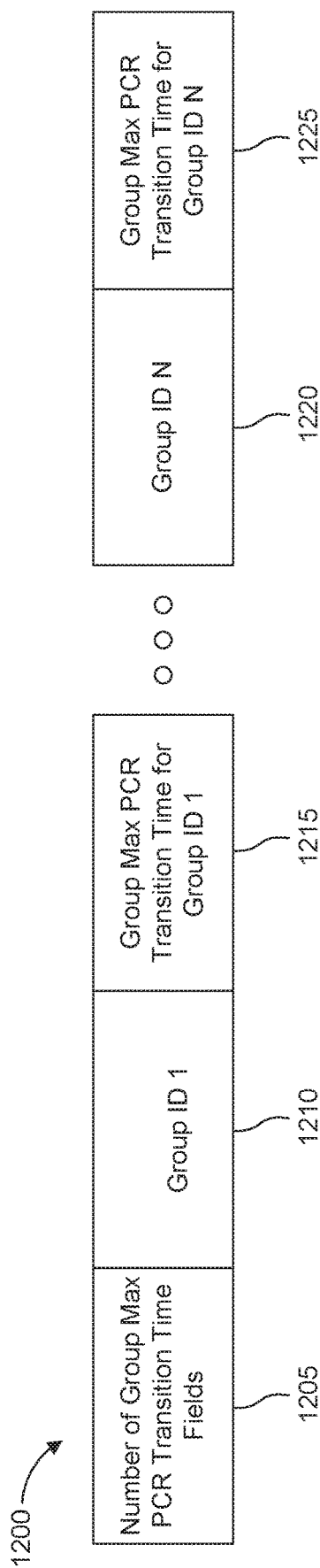
FIG. 12 is a diagram illustrating an example group max PCR transition time subfield of format 2.

FIG. 12 illustrates an example group max PCR transition time subfield of format 2 1200. As illustrated in FIG. 12, the group max PCR transition time subfield of format 2 1200 may include number of group max PCR transition time fields 1205, group ID 1 1210, group max PCR transition time for group ID 1 1215, group ID N 1220, and group max PCR transition time for group ID N 1225. This format 1200 may be used if there is group max PCR transition time for just a few group IDs. The group max PCR transition time fields count 1205 may indicate the number of groups IDs for which group max PCR transition time is indicated. The group max PCR transition time fields count 1205 may indicate a value that is equal to or smaller than the number of bit "1"s included in the group ID Bitmap subfield in the group ID list subfield. The group ID subfield may indicate the group ID for which the group max PCR transition time is indicated in the group N max PCR transition time that follows the group ID field.

A WUR AP may provide in the max group delays subfield in the WUR parameter field included in the WUR mode element. The maximum PCR transition delay for a group of STAs may be identified by a group ID. The maximum PCR transition delay may be defined as the maximum value of the PCR transition delay values in the WUR capabilities elements indicated by all the WUR non-AP STAs that are not in the awake state, have negotiated WUR power management service with the WUR AP, and are in WUR mode.

A non-AP STA that has its WUROptionImplemented set to "true" may record the group max PCR transition time for all the groups that it is assigned to. If it receives a wake-up frame including a group ID for which it is associated with, it may first check the stored group max PCR transition time, and determine the difference between its own PCR transition time with the group max PCR transition time.

In another example, the non-AP that has its WUROptionImplemented set to "true" may calculate the difference between the group max PCR transition time and its own PCR transition time for all the groups that it is assigned to and store the differences for each group associated with a GID. If it receives a wake-up frame including a group ID for which it is associated with, it may first check the stored time difference for the group associated with the GID. The non-AP STA may delay its PCR transition with an amount of time that is equal or less than the difference between the group max PCR transition time for the particular GID and its own PCR transition time. Alternatively or additionally, it may turn on its PCR component immediately, but not attempt to receive any packets until the time that is equal or less than the difference between the group max PCR transition time for the particular GID and its own PCR transition time has passed.

In another example, the PCR component of a WUR non-AP STA may be in the doze state until the maximum PCR transition delay for a group ID has expired if the WUR non-AP STA receives a WUR wake-up frame from its associated WUR AP addressed to a group ID to which the STA is assigned and if the maximum PCR transition delay for the group ID has been indicated by the AP in a WUR mode element.

Although the embodiments described herein consider 802.11 specific protocols, it is understood that the embodiments described herein are not restricted to this scenario and are applicable to other wireless systems such as cellular networks, 4G networks, and 5G (or NR) networks as well. Although SIFS is used to indicate various inter frame spacing in the examples of the designs and procedures, all other inter frame spacing such as RIFS or other agreed time interval could be applied in the same solutions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
    maintaining a Basic Service Set (BSS) parameter update counter associated with a BSS associated with a primary connectivity radio (PCR) transceiver;
    receiving, via the PCR transceiver, a beacon frame or a wake-up radio (WUR) action frame that includes a WUR operation element having a first counter value indicating a current value of the BSS parameter update counter associated with the BSS of the PCR transceiver;
    updating the BSS parameter update counter to the first counter value received in the WUR operation element;
    deactivating the PCR transceiver and entering a WUR mode, wherein the PCR transceiver enters into a doze state;
    receiving a WUR frame that includes a second counter value indicating that an update of a plurality of BSS parameters associated with the BSS of the PCR transceiver is available; and
    on a condition that the second counter value is different than the BSS parameter update counter, activating the PCR transceiver to receive a beacon frame including an update of the plurality of BSS parameters.

2. The method of claim 1, wherein the action frame is a WUR mode setup frame.

3. The method of claim 1, further comprising activating a WUR transceiver to enter the WUR mode after the PCR transceiver is deactivated, wherein the WUR transceiver is a companion radio.

4. The method of claim 1, wherein the WUR frame is a broadcast WUR wake-up frame.

5. The method of claim 1, further comprising:
    transmitting, via the PCR transceiver in the awake state, a response frame in response to the WUR frame.

6. A wireless transmit/receive unit (WTRU) comprising:
    a primary connectivity radio (PCR) transceiver; and
    a processor,
    wherein the processor is configured to maintain a Basic Service Set (BSS) parameter update counter associated with a BSS of the PCR transceiver;
    the processor and the PCR transceiver are configured to receive a beacon frame or a wake-up radio (WUR) action frame that includes a wake-up radio (WUR) operation element having a first counter value indicating a current value of the BSS parameter update counter associated with the BSS associated with the PCR transceiver;
    the processor is further configured to:
        update the BSS parameter update counter to the first counter value received in the WUR operation element;
        deactivate the PCR transceiver and enter a WUR mode, wherein the PCR transceiver enters into a doze state;
        receive, while in the WUR mode, a WUR frame that includes a second counter value indicating that an update of a plurality of BSS parameters associated with the BSS of the PCR transceiver is available; and
        on a condition that the second counter value is different than the BSS parameter update counter, activate the PCR transceiver to receive a beacon frame including an update of the plurality of BSS parameters.

7. The WTRU of claim 6, wherein the action frame is a WUR mode setup frame.

8. The WTRU of claim 6, further comprising a WUR transceiver configured to activate the WUR transceiver to enter the WUR mode after the PCR transceiver is deactivated, wherein the WUR transceiver is a companion radio.

9. The WTRU of claim 6, wherein the WUR frame is a broadcast WUR wake-up frame.

10. The WTRU of claim 6, wherein the PCR transceiver in the awake state is further configured to transmit a response frame in response to the WUR frame.

* * * * *